United States Patent [19]
Lipkie et al.

[11] Patent Number: 4,718,105
[45] Date of Patent: Jan. 5, 1988

[54] GRAPHIC VECTORIZATION SYSTEM

[75] Inventors: Curtis A. Lipkie, Littleton; Eugene A. Kleca, Broomfield, both of Colo.

[73] Assignee: ANA Tech Corporation, Littleton, Colo.

[21] Appl. No.: 585,258

[22] Filed: Mar. 1, 1984

Related U.S. Application Data

[63] Continuation-in-part of Ser. No. 475,037, Mar. 14, 1983, Pat. No. 4,603,431.

[51] Int. Cl.[4] ............................................. G06K 9/36
[52] U.S. Cl. .......................................... 382/56; 382/25; 382/26; 358/260
[58] Field of Search ............... 364/523; 358/260, 263, 358/284; 382/56, 25, 20, 26, 54

[56] References Cited

U.S. PATENT DOCUMENTS

| | | | |
|---|---|---|---|
| 3,521,241 | 7/1970 | Rumble | 340/172.5 |
| 3,609,685 | 9/1971 | Deutsch | 382/21 |
| 3,801,737 | 4/1974 | Komura | 178/6 |
| 3,830,964 | 8/1974 | Spencer | 178/6 |
| 3,937,871 | 2/1976 | Robinson | 178/6 |
| 3,956,580 | 5/1976 | Murayama | 178/6 |
| 3,992,572 | 11/1975 | Nakagome | 178/6 |
| 4,103,287 | 7/1978 | Frank | 340/146.3 H |
| 4,107,648 | 8/1978 | Frank | 340/146.3 H |
| 4,183,013 | 1/1980 | Agrawala et al. | 382/56 |
| 4,189,711 | 2/1980 | Frank | 358/260 |
| 4,213,154 | 7/1980 | Ono | 358/260 |
| 4,229,768 | 10/1980 | Kurahayashi et al. | 382/56 |
| 4,307,377 | 12/1981 | Pferd et al. | 358/260 |
| 4,368,462 | 1/1983 | Crawley | 340/723 |
| 4,375,654 | 3/1983 | Evans et al. | 358/260 |

Primary Examiner—Leo H. Boudreau
Assistant Examiner—Jose L. Couso
Attorney, Agent, or Firm—Bromberg, Sunstein & Casselman

[57] ABSTRACT

A method and apparatus is described in which a document is scanned and the coordinates of each graphic element intercepted along the scan line are analyzed to encode a compact digital representation of the various graphic elements. In one embodiment, detected features of a height less than a first dimension or having both a width less than a desired width threshold and a height less than a desired height threshold are deleted as representative of noise. No data representative of topological or dimensional features is output until after the continued recognition of such features for more than a threshold number of scan lines.

45 Claims, 33 Drawing Figures

PROCESSING

FIG. 5

(EXISTING VECTOR COMING DOWN FROM ABOVE)

```
SJ    ──▶ *******************************************
SJ+1  ──▶ *******************************************
SJ+2  ──▶ ****     ****      ************************
SJ+3  ──▶ ****     * **    **** *       *   *******       ↓ FUZZ=3
SJ+4  ──▶ ****      *      *  *  *              *****
          ****                  *                *****
          ****                  *                *****
          ****                  *                *****
          ****                  *                *****
          ****                  *                *****
          ****                  *                *****
          ****                  *                *****
           ↑                    ↑                  ↑
       FIRST LEG          SECOND LEG          LAST LEG
```

FIG. 6

```
       FIRST LEG          SECOND LEG          LAST LEG
          ↓                    ↓                  ↓
         ****                  *                *****
         ****                  *                *****
         ****                  *                *****
         ****                  *                *****
         ****                  *                *****
         ****                  *                *****
         ****                  *                *****
         ****         *    *  *   ******************
         ****       * **      ****  ******************      ↓ FUZZ=3
         ****       *****     *********************
JUNCTION ──▶ *******************************************
SURFACE FOR  *******************************************
THE 3 VECTORS *******************************************
             *******************************************
             *******************************************
```

FIG. 8

```
15 14 13 12 11 10  9  8  7  6  5  4  3  2  1  0
-------------------------------------------------
| FORMAT |  |  |  |  |  |  |  |  |  |  |  |  |  |
-------------------------------------------------
```

FIG. 9
FORMAT 0 - NEW VECTOR RECORD

```
          15 14 13 12 11 10  9  8  7  6  5  4  3  2  1  0
         -------------------------------------------------
WORD 1   | 0| 0| 0| M| 0| 0|      V                      |
         -------------------------------------------------
WORD 2   |                    L                           |
         -------------------------------------------------
WORD 3   |                    R                           |
         -------------------------------------------------
WORD 4   |                  OFFSET                        |
         -------------------------------------------------
```

V     - VECTOR NUMBER
M     - MODIFIER BIT

0 - RECORD LENGTH IS 3 WORDS. THE SCAN NUMBER
           (SCAN) OF THE START OF THE VECTOR IS:

SCAN = S - FUZZ

1 - RECORD LENGTH IS 4 WORDS. THE SCAN NUMBER
           (SCAN) OF THE START OF THE VECTOR IS:

SCAN = S - OFFSET

L     - LEFT COORDINATE OF END OF VECTOR
R     - RIGHT COORDINATE OF END OF VECTOR
OFFSET - OFFSET FROM CURRENT SCAN (S) FOR START OF VECTOR (ONLY
        IF M=1)

FORMAT 0 - NEW VECTOR RECORD

FORMAT 2 - CONTINUATION VECTOR RECORD

FIG. 11
FORMAT 1 RECORD - END OF VECTOR RECORD

```
         15 14 13 12 11 10  9  8  7  6  5  4  3  2  1  0
        ------------------------------------------------
WORD 1  | 0| 0| 1| M  | 0|           V                 |
        ------------------------------------------------
WORD 2  |                    L                         |
        ------------------------------------------------
WORD 3  |                    R                         |
        ------------------------------------------------
WORD 4  |                  OFFSET                      |
        ------------------------------------------------
```

V — VECTOR NUMBER
M — MODIFIER BIT

0 — RECORD LENGTH IS 3 WORDS. THE SCAN NUMBER (SCAN) OF THE END OF THE VECTOR IS:

$$SCAN = S - MAXMIS - 1$$

2 — RECORD LENGTH IS 1 WORD. THE L AND R OF THE END OF THE VECTOR IS THE SAME AS THE LAST RECORD THAT DESCRIBED THE THE VECTOR V. THE SCAN NUMBER (SCAN) OF THE END OF THE VECTOR IS:

$$SCAN = S - MAXMIS - 1$$

3 — RECORD LENGTH IS 4 WORDS. THE SCAN NUMBER (SCAN) OF THE END OF THE VECTOR IS $$SCAN = S - OFFSET$$

L — LEFT CORRDINATE OF END OF VECTOR (ONLY IF M=0 OR M=3)
R — RIGHT CORRDINATE OF END OF VECTOR (ONLY IF M=0 OR M=3)
OFFSET — SCAN OFFSET FOR END OF VECTOR (ONLY IF M=3)

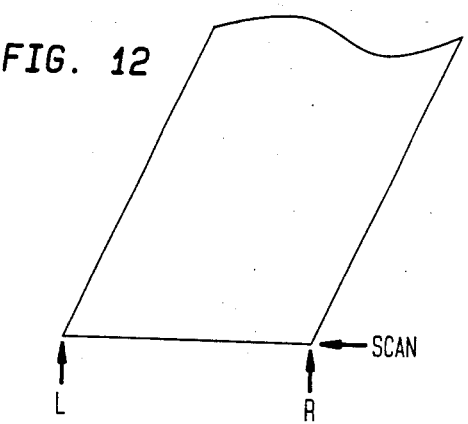

FIG. 12

FIG. 13
FORMAT 2 RECORD — CONTINUATION VECTOR RECORD

```
        15 14 13 12 11 10  9  8  7  6  5  4  3  2  1  0
       -------------------------------------------------
WORD 1 | 0| 1| 0| M| 0| 0|           V                 |
       -------------------------------------------------
WORD 2 |                    L                          |
       -------------------------------------------------
WORD 3 |                    R                          |
       -------------------------------------------------
WORD 4 |                  OFFSET                       |
       -------------------------------------------------
```

V — VECTOR NUMBER
M — MODIFIER BIT

0 — RECORD LENGTH IS 3 WORDS. THE SCAN NUMBER (SCAN) OF THE CONTINUATION POINT OF THE VECTOR IS:

$$SCAN = S - 1$$

1 — RECORD LENGTH IS 4 WORDS. THE SCAN NUMBER (SCAN) OF THE CONTINUATION POINT IS:

$$SCAN = S - OFFSET$$

L — LEFT COORDINATE OF CONTINUATION POINT OF THE VECTOR
R — RIGHT COORDINATE OF CONTINUATION POINT OF THE VECTOR
OFFSET — SCAN OFFSET FOR CONTINUATION POINT OF VECTOR (ONLY IF M=1)

FIG. 15
FORMAT 3 - INCREMENT SCAN NUMBER RECORD

```
         15 14 13 12 11 10  9  8  7  6  5  4  3  2  1  0
        ---------------------------------------------------
WORD 1  | 0| 1| 1|           SINC                        |
        ---------------------------------------------------
```

SINC - NUMBER OF SCANS TO INCREMENT THE SCAN NUMBER COUNTER
S = S + SINC

FIG. 16
FORMAT 4 RECORD - END OF FILE RECORD

```
         15 14 13 12 11 10  9  8  7  6  5  4  3  2  1  0
        ---------------------------------------------------
WORD 1  | 1| 0| 0| 0| 0| 0| 0| 0| 0| 0| 0| 0| 0| 0| 0| 0|
        ---------------------------------------------------
```

FIG. 17

| FIG. 17A |
|----------|
| FIG. 17B |

FIG. 17A

FORMAT 5 RECORD - Y JUNCTION RECORD

```
        15 14 13 12 11 10 9 8 7 6 5 4 3 2 1 0
        -----------------------------------------
WORD 1  | 1| 0| 1| JT | M|        V              |
        -----------------------------------------
WORD 2  |                    L                   |
        -----------------------------------------
WORD 3  |                    R                   |
        -----------------------------------------
WORD 4  |                  OFFSET                |
        -----------------------------------------
```

JT — JUNCTION RECORD TYPE:
    0 — SURFACE RECORD (FIRST RECORD IN A SEQUENCE
        OF Y JUNCTION RECORDS)
    1 — Y JUNCTION LEG RECORD
    2 — Y JUNCTION LEG RECORD
    3 — Y JUNCTION LEG RECORD (LAST RECORD IN A
        SEQUENCE OF Y JUNCTION RECORDS)

THE VALUE OF JT DETERMINES THE INTERPRETATION OF THE REMAINING VALUES OF THE Y JUNCTION RECORD:

JT = 0 SURFACE RECORD
---------------------

V   — VECTOR NUMBER OF THE LEFTMOST VECTOR
          IN THE SEQUENCE OF VECTORS THAT JOIN AT THE
          Y JUNCTION SURFACE. THIS IS THE VECTOR NUMBER
          OF THE VECTOR THAT WILL CONTINUE THROUGH THE
          SURFACE.

M   — MODIFIER BIT
          0 — RECORD LENGTH IS 3 WORDS. THE SCAN NUMBER
              (SCAN) OF THE JUNCTION SURFACE IS:

SCAN = S

ALSO SPECIFIES THAT THE DEFAULT SCAN OFFSET
            FOR FOLLOWING Y JUNCTION LEG RECORDS IS:

YOFFSET = FUZZ + 1

1 — RECORD LENGTH IS 4 WORDS. THE SCAN NUMBER
              (SCAN) OF THE JUNCTION SURFACE IS:
              SCAN = S - 1

ALSO SPECIFIES THAT THE DEFAULT SCAN OFFSET
            FOR FOLLOWING Y JUNCTION LEG RECORDS IS:
              YOFFSET = OFFSET

FIG. 17B

```
L      - LEFT COORDINATE OF JUNCTION SURFACE
R      - RIGHT COORDINATE OF JUNCTION SURFACE
OFFSET - DEFAULT SCAN OFFSET FOR FOLLOWING Y JUNCTION LEG
         RECORDS (ONLY IF M=1)
```

JT = 1, 2, OR 3 LEG RECORD
---------------------------

THE CONTENTS OF THE RECORDS ARE THE SAME FOR JT = 1, 2, OR 3.
THE JT VALUE DENOTES THE FOLLOWING ABOUT THE LEG VECTOR:

1 - THE PREVIOUS RECORD FOR WHICH A REFERENCE WAS MADE
    TO THIS VECTOR WAS AN L JUNCTION LEG RECORD
2 - THIS IS AN INTERMEDIATE LEG RECORD IN A SERIES OF
    Y JUNCTION RECORDS
3 - THIS IS THE LAST LEG RECORD IN A SERIES OF Y JUNCTION
    RECORDS

RECORD CONTENTS:

V     - VECTOR NUMBER OF THE VECTOR. NOTE: THE FIRST
        LEG RECORD (JT=1 OR JT=2) WILL HAVE THE SAME
        VECTOR NUMBER AS THE VECTOR NUMBER SPECIFIED
        IN THE SURFACE RECORD.

M     - MODIFIER BIT

0 - RECORD LENGTH IS 3 WORDS. THE SCAN NUMBER
            (SCAN) OF THE TOP OF THE LEG IS:

IF JT = 1 THEN
                   SCAN = S - YOFFSET + 1
                ELSE
                   SCAN = S - YOFFSET
                END

NOTE: THE VALUE OF YOFFSET IS DETERMINED
                  BY THE PREVIOUS SURFACE RECORD
                  (FORMAT=5, JT=0)

1 - RECORD LENGTH IS 4 WORDS. THE SCAN NUMBER
            (SCAN) OF THE TOP OF THE LEG IS:

SCAN = S - OFFSET

L      - LEFT COORDINATE OF THE TOP OF THE LEG
R      - RIGHT COORDINATE OF THE TOP OF THE LEG
OFFSET - SCAN OFFSET FOR THE TOP OF THE LEG (ONLY IF M=1)

FORMAT 5 - Y JUNCTION RECORD

FIG. 19

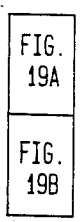

FIG. 19A
FORMAT 6 RECORD - L JUNCTION RECORD

```
         15 14 13 12 11 10  9  8  7  6  5  4  3  2  1  0
        -------------------------------------------------
WORD 1  |  1| 1| 0|  JT  | M|          V                |
        -------------------------------------------------
WORD 2  |                    L                          |
        -------------------------------------------------
WORD 3  |                    R                          |
        -------------------------------------------------
WORD 4  |                  OFFSET                       |
        -------------------------------------------------
```

JT   - JUNCTION RECORD TYPE:
         0 - SURFACE RECORD (FIRST RECORD IN A SEQUENCE
             OF L JUNCTION RECORDS)
         2 - L JUNCTION LEG RECORD
         3 - L JUNCTION LEG RECORD (LAST RECORD IN A
             SEQUENCE OF L JUNCTION RECORDS)

THE VALUE OF JT DETERMINES THE INTERPRETATION OF THE REMAINING
VALUES OF THE L JUNCTION RECORD:

JT = 0 SURFACE RECORD
--------------------

V    - VECTOR NUMBER OF THE TOP VECTOR THAT IS
         ABOVE THE L JUNCTION SURFACE.

M    - MODIFIER BIT

0 - RECORD LENGTH IS 3 WORDS. THE SCAN NUMBER
                 (SCAN) OF THE JUNCTION SURFACE IS:

SCAN = S - FUZZ - 1

1 - RECORD LENGTH IS 4 WORDS. THE SCAN NUMBER
                 (SCAN) OF THE JUNCTION SURFACE IS:

SCAN = S - OFFSET

L      - LEFT COORDINATE OF JUNCTION SURFACE
  R      - RIGHT COORDINATE OF JUNCTION SURFACE
  OFFSET - SCAN OFFSET OF THE L JUNCTION SURFACE (ONLY IF M=1)

FIG. 19B

JT = 2 OR 3 LEG RECORD
----------------------

THE CONTENTS OF THE RECORDS ARE THE SAME FOR JT = 2 OR 3.
THE JT VALUE DENOTES THE FOLLOWING ABOUT THE LEG VECTOR:

2 - THIS IS AN INTERMEDIATE LEG RECORD IN A SERIES OF
       L JUNCTION RECORDS.
   3 - THIS IS THE LAST LEG RECORD IN A SERIES OF L JUNCTION
       RECORDS.

RECORD CONTENTS:

V     - VECTOR NUMBER OF THE VECTOR. NOTE: THE FIRST
          LEG RECORD (JT=2) WILL HAVE THE SAME
          VECTOR NUMBER AS THE VECTOR NUMBER SPECIFIED
          IN THE SURFACE RECORD.
   M    - MODIFIER BIT

NOT USED. ALWAYS SET TO 0. (THE VECTOR RECORD
          LENGTH IS 3 WORDS)

L     - LEFT COORDINATE OF THE BOTTOM OF THE LEG
   R     - RIGHT COORDINATE OF THE BOTTOM OF THE LEG

THE SCAN NUMBER (SCAN) OF THE BOTTOM OF THE LEG IS:

SCAN = S

FORMAT 6 - L JUNCTION RECORD

FIG. 21
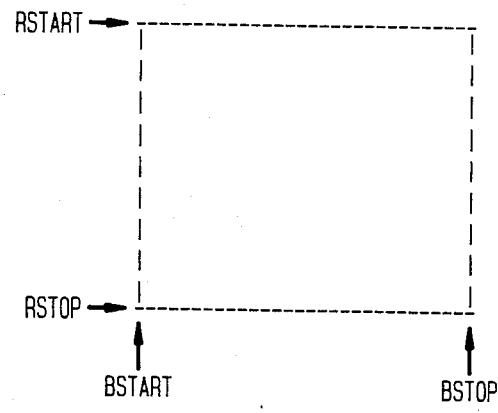
FIG. 22
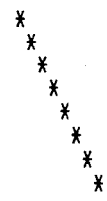
FIG. 23
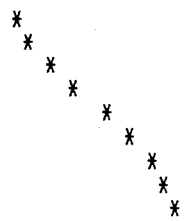
FIG. 24
```
*****
 *****
  *****
   *****
    *****
     *****
      *****
       *****
```
FIG. 25
```
******************
******************
******************
******        *******
******        *******
******        *******
******        *******
******        *******
******        *******
******************
******************
******************
```

FIG. 26A

BEFORE FLATTENING:

AFTER FLATTENING:

BEFORE FLATTENING:

AFTER FLATTENING:

```
*************
*************
*************
*************
*************
*************
*************
*************
*************
*************
*************
*************
```

GRAPHIC VECTORIZATION SYSTEM

This application is a continuation-in-part of application Ser. No. 475,037, filed Mar. 14, 1983, now U.S. Pat. No. 4,603,431, which issued on July 29, 1986.

TECHNICAL FIELD

The present invention relates to computer graphic data entry systems and to means for digitizing graphic information.

BACKGROUND ART

Various patents and devices described therein are known in the art for digitizing a graphical representation of two dimensional regions of an image having differing light values. In particular, it is known to employ coding techniques which represent linear segments by specifying the end points and thickness of the segment, as in U.S. Pat. No. 4,307,377; it is also known to code regions of differing intensity by ascertaining the branch points of boundaries of such regions, as in U.S. Pat. No. 4,189,711. It is also quite generally known to employ a piecewise linear curve fitting procedure to arrive at a digital approximation representing the boundary of a region. In order to produce a digital representation which can be utilized for computer graphics applications, such as editing and manipulation of engineering drawings, the digital representation must be sufficiently fine to represent all material dimensional features of the original; it must also represent all topological features, such as branch points. Topological data is necessary because typically at a computer graphic work station, one desires to manipulate a feature on the monitor screen, such as a girder by simply pointing to a point of its image with the cursor. This requires that post-processing software be developed which recognizes the graphic elements connected to the given point. The recognition of topological data is not easy. As a practical matter, fly specks, ink spots, and voids might easily be represented as complicated assemblies of branch points, causing a graphic digitizer to yield outputs indicative of complex topological branching. Such outputs could unnecessarily complicate the post-processing pattern recognition functions of a computer graphic system. Thus, a natural tension exists between designing a graphic digitizer which catches all significant graphic details, yet efficiently recognizes printing inperfections, and does not pass on extraneous output data related to such imperfections.

SUMMARY OF THE INVENTION

A method and apparatus is described in which a document is scanned and the coordinates of each graphic element intercepted along the scan line are analyzed to encode a compact digital representation of the various graphic elements. In one embodiment, detected features of a height less than a first dimension, called FUZZ, if not wider than a predetermined threshold of graphic significance (the "flywidth"), are deleted as representative of noise. In another embodiment, detected features having both a width less than a desired width threshold, and a height less than a desired height threshold are "filled" as representative of the type of noise characteristic of, e.g., ink spots or voids. The processor proceeds by maintaining in a small memory blocks of data representative of each significant graphic element encountered in preceding scan lines. The current intercepted coordinates are compared to this memory data to detect significant features such as lambda and Y-junctions, and specially coded output records are generated upon the confirmation of certain significant features such as a lambda junction surface or leg, a Y-junction surface or branch, or the end of a graphic element. During processing, and until a sufficient number of scan lines have occurred to determine whether a scanned feature is a hole, a printing irregularity, or an actual junction, current data continues to be stored, and no connectivity output records are generated. However, when the threshold number of scans has passed and a branch or other significant feature is confirmed, the code representative of the type and location of such feature is output. The hole-filling operation is suspended when a potential lambda junction point is first encountered; thus, if subsequent scans confirm the presence of a lambda junction, the initial separation of the graphic elements is not inadvertently filled, and the digitized output provides an accurate representation of the location of the lambda branch point. Means are also provided for squaring off ends of graphic elements, and for smoothing the representation of multiply branched features to a common junction surface on a single scan line.

Because no data representative of topological or dimensional features is output until after the continued recognition of such features for more than FUZZ scan lines, microscopic streamers and other routine printing irregularities are not memorialized in the output records as microscopic Y or lambda junctions. Rather, data related to features less than, say, five scan lines tall, corresponding in a preferred embodiment to several thousandths of an inch, is provisionally stored in separate registers, and if not confirmed by the scanning of comparable patterns on at least FUZZ scan lines, is deleted from the digitized information. Similarly, when a portion of the image of differing intensity, but having dimensions less than a preset height and width, is encountered in the middle of a graphic element, so that the intercepts along a scan line branch out around that portion, the determination of whether a microscopic hole or a lambda branch point had been encountered is delayed until a sufficient number of subsequent scan lines have occurred to determine whether the void feature was in fact smaller than a characteristic hole size. Thus, the graphic information of a lambda junction is not lost by premature hole filling, nor is the accumulation of output records complicated by premature generation of a connectivity record when in fact a hole is encountered.

BRIEF DESCRIPTION OF THE DRAWINGS

These and other features of the invention will be understood with respect to the drawings, in which:

FIG. 5 shows features subject to L-junction processing; and

FIG. 6 shows features subject to Y-junction processing.

FIG. 8 shows a schematic representation of format number encoding according to the present invention;

FIGS. 9-20 show a variety of format records according to the present invention;

FIG. 21 shows a schematic representation of the BSTART, BSTOP, RSTART, and RSTOP parameters according to the present invention;

FIGS. 22-24 demonstrate the use of the EPS parameter according to the present invention;

FIG. 25 shows a hole-filling example using the TALHOL parameter according to the present invention; and FIGS. 26A, 26B, 27A and 27B show examples of flattening using the NEWTOP and MINBOT parameters according to the present invention.

DETAILED DESCRIPTION

Figure 1A:
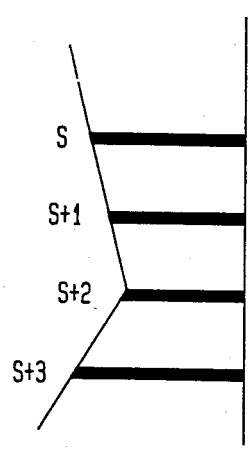
FIGS. 1A through 1E show representative graphic elements along successive scan lines.

The present invention is an improvement in a computer graphic data entry system, or document digitizer, such as that described in the pending patent application *Method and Apparatus for Vectorizing Documents and for Symbol Recognition,* Ser. No. 475,037, filed Mar. 14, 1983, now Pat. No. 4,603,431, of the present inventors, with David Grover, which application, including the disclosure therein, is hereby incorporated by reference as illustrative of a technique of encoding graphic elements. That device utilizes a series of arithmetic comparisons of the edge and center coordinates of the successive intercepts of scanned graphic features with those of corresponding intercepts on, or data generated from, preceding scan lines to determine the basic branch point and dimensional properties of the intercepted elements and to generate the compact output code representative of such information. One embodiment of that device, while fast and accurate, had such a high resolution that microscopic imperfections in drawings resulted in the generation of "phantom" output records, descriptive of the imperfections. Such sensitivity might prove invaluable in the analysis of metallurgical photomicrographs of etched fissures, or other detailed noise-free graphics. However in the digitizing of engineering drawings such sensitivity leads to the production of extraneous output records. The present invention embodies a novel processing technique which overcomes that problem.

FIG. 1 shows, at 1A to 1E thereof, representative conditions of branching or significant dimensional change of graphic elements, with the scan line intercepts occurring on successive scan lines S, S+1, S+2, etc. The scanned document may be conceptualized as bearing a coordinate system corresponding to the scan line number (vertical axis) and the pixel number (horizontal axis) as it is scanned. Using such a coordinate system, each scan line intercept may be uniquely represented in terms of, e.g., its left and right coordinates, or its center coordinate and width. Either pair of coordinates may be derived from the other, or all four may be simultaneously fed as an input and used for quickly effecting different arithmetic calculations. In FIG. 1A, there is shown a graphic element, or vector, which is intercepted by successive scans, S, S+1, S+2, S+3. According to the graphic digitizing invention of the above-referenced application, the graphic element of FIG. 1A would be encoded during processing, by storing, in a small memory, data derived from comparison of the coordinates of the intercepts along the scan lines, which data would be sufficient to include the starting point of the graphic element, and linear functions representing the center line and extent, so long as these coordinates remained within prescribed dimensional tolerances. This stored memory data is called, both in the cited application and the present disclosure, a vector memory record; it includes compressed data representing the graphic element over a number of preceding scan lines. The small region of the image which is represented by the vector record is called a vector.

In FIG. 1A, the dimensional change occurring between scan S+2 and S+3, if greater than a preset tolerance threshold, would be recognized, causing an output of data from the vector record and the storage of new information from scan S+3 down, such information being derived to represent the coordinates of the graphic element below that point. A code would also be output, indicating the connection between the upper and lower vectors as what was variously called, in that application, a continuation or simple overlap.

Figure 1B:
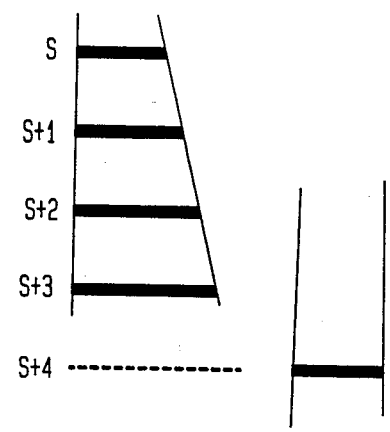

Turning now to FIG. 1B, there is shown a similar situation to that of 1A, in which the graphic element simply fails to appear after scan S+3. In this circumstance, assuming that no corresponding intercept occurs in the next several scan lines, the graphic element is determined to have terminated, and an output is made of data from the vector record giving a linear description of the vector together with a code indicating it has terminated. Thereupon, the stored data in memory is deleted, as it is of no further use for comparison to subsequent lines.

Figure 1C:
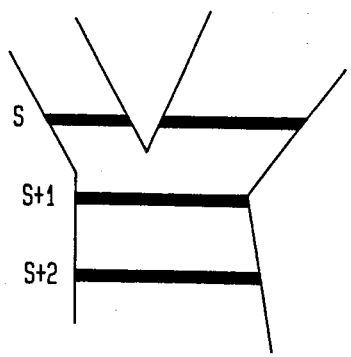

Turning now to FIG. 1C there is shown the graphical construct recognized as a Y junction, together with the scan line intercepts characteristic thereof. According to the invention of the aforesaid patent application, a Y junction is recognized by the comparison of the coordinates of two overlying branches with those of the trunk encountered on a successive line. In the example shown, when the processor has reached scan line S+1, a Y junction is recognized because the right edge of the left upper branch and the left edge of the right upper branch each lie above a portion of the trunk of the Y junction. On determination that Y junction has occurred, the dimensional information representative of the upper right branch is delivered as an output of the machine, together with a code indicative of its Y connection to the left branch. Similarly, the dimensional data representative of the left branch is output, together with a code indicating that it is connected to the trunk. After line S+1, only a digitized representation of the trunk remains in the vector memory. External processing may then be employed in order to synthesize the entire graphic image from the compressed data which has been output during the course of scanning.

Figure 1D:
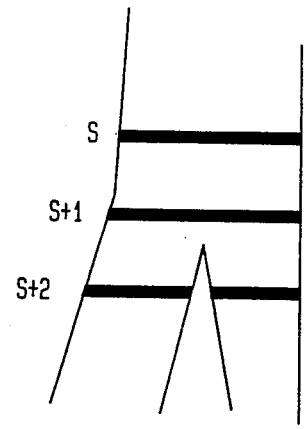

Turning now to FIG. 1D, there is shown an image characterized as a lambda or L junction according to the prior invention. In the case of a lambda junction, a single graphic element bifurcates on successive scan lines. In this instance the digitizer of the prior invention recognizes that the right coordinate of the left leg and the left coordinate of the right leg both lie below the intercept of the graphic element along the preceding scan line, and accordingly an L-junction or bifurcation of the element has occurred.

Figure 1E:
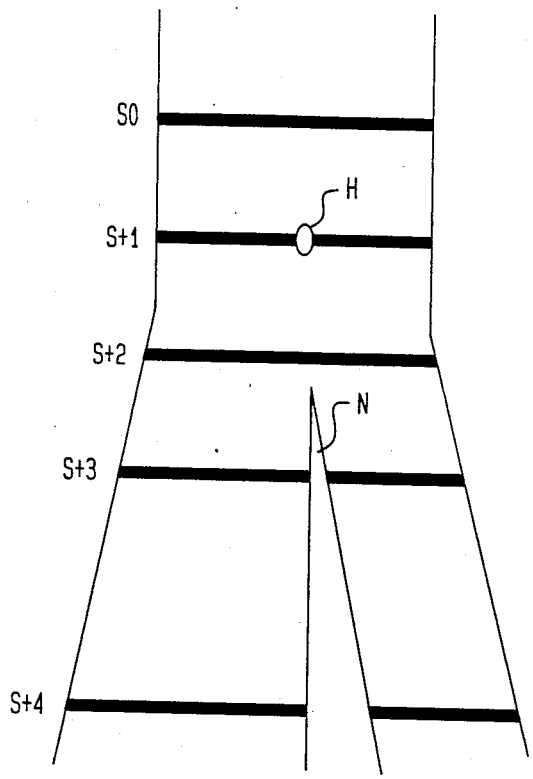

Turning now to FIG. 1E, there is shown an image similar to 1D but including a first region having a small hole therein, at scan line number S+1, and also bifurcating into a lambda junction at scan line S+3. According to the prior invention, the hole appearing at scan line S+1, if of a diameter less than a threshold (TRO(V)/2) would simply be filled, so that rather than two segments appearing on scan line S+1, which would be indicative of the legs of an L junction, the left edge of the first segment and the right edge of the second segment are taken as the coordinates of a fictitious "filled" segment in which the ink spot or void represented by the hole H has been filled. Thus, according to that invention, no output record would be generated and the hole would be simply filled. A difficulty in this manner of processing is that when one reaches scan line S+3, a virtually identical spacing may occur at notch N of the lambda junction. If the hole filling algorithm were also implemented at that point, then again at scan line S+3 a single broad intercept of width extending from the left of the left leg to the right of the right leg would occur. At scan line S+4, if the separation of the two segment were greater than the threshold, the processor would finally recognize the lambda junction and cause appropriate output records to be generated. Manifestly, however, if the notch between the two legs is an extremely small angle, this hole filling feature could cause a lambda junction to go unrecognized for a substantial number of scan lines, because although the scanner would detect the presence of two adjacent intercepts in the two legs of the lambda, it would fill the space between them until the gap were sufficiently wide to not be recognized as a hole and automatically filled.

Figure 2:
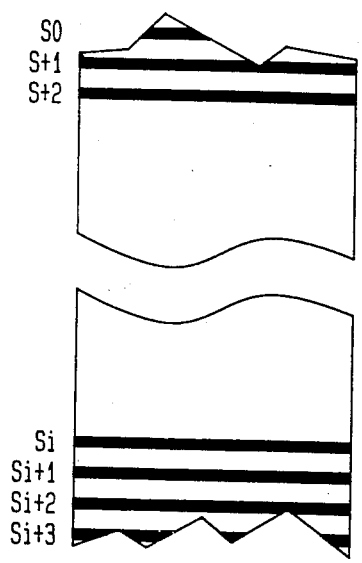
FIG. 2 shows a representative graphic element, at a greater magnification.

Turning now to FIG. 2, there is shown an enlarged view of a graphic image approximately in the shape of a straight line having constant width and intercepted along successive scan lines S0, S1 ... at the top, and Si, Si+1 ... at the bottom thereof. Due to microscopic variations in document texture, or to strike or flow irregularities of the printing process, both the edges and the ends of the graphic element shown, which for purposes of dicussion may be taken as representative of a typical line drawn by a pen, are wavy and irregular on a microscopic level. According to the processing technique disclosed in the above referenced application, the minor variations in left/right edge coordinates are of little significance as they do not require coding of new information or adjustment of linear parameters in the vector storage, so long as they are less than a predetermined threshold. However, the vertically oriented aberrations on the tops and bottoms of lines are more troublesome. As shown, when the image passes the first scan at S0 the scanner will intercept two segments; similarly for scan line S+1. Thus when at scan line S+2 a single intercept, the width of the graphic element, is encountered, a Y-junction record would be generated and the device would cause to be output vectorized descriptions of the left and right upper branches of the Y, together with the Y-junction code. Thus an insignificant imperfection in the drawing would lead to the generation of extraneous output data. Similarly, at the lower end of the scanned image, when the scanner passes from scan line Si to scan line Si+1, a lambda junction would be recognized and two new vector records commenced for the legs of the junction, although these "legs" are in fact insignificant graphic elements which disappear after another 1 or 2 scan lines respectively.

The discussion of the prior invention in relation to these figures shows several problems which could be encountered along particular scanning directions using the prior invention. These problems are overcome in a preferred embodiment of the present invention, by employing a processing method and an apparatus in which a provisional storage means is used for retaining data for a preselected number of scan lines while it is determined whether the scanned data is actually a significant graphic feature, or may be disregarded as noise. In a further embodiment, scanned features having first and second dimensions less than first and second preselected limits are determined to be holes and are filled. The information representative of such scanned features is held in the provisional memory until a sufficient number of scan lines have passed to verify the dimensional criteria. In a further preferred embodiment, when a lambda junction is provisionally recognized, a lambda junction surface record is generated, but not output at that time. If the predetermined number of succeeding scans confirms the presence of the notch characteristic of a lambda junction, the precise coordinates of the top of the notch are thus not lost due to the hole filling operation. These and other features of the invention will be better understood in relation to the discussion below, concerning the sequence of processing steps in a preferred embodiment of the present invention.

Figure 3:
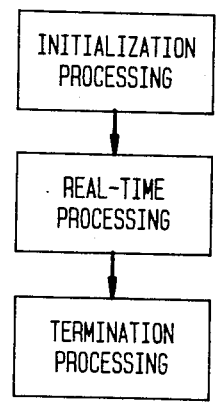
FIG. 3 is a block diagram of the operation of the present invention.

Turning now to FIG. 3, there is shown a block diagram of the graphic digitizer according to the present invention. As in the previous embodiment, the invention operates on scanner data, such as the raster output generated by scanning consecutive lines along a document. In a straightforward way, the raw scan information is fed as a series of coordinates of consecutive intercepts of the graphic elements scanned along each scan line. The coordinates of these intercepts are compared by a number of simple arithmetic comparisons to corresponding coordinates which have been stored as "vector memory records" for the graphic elements above the given intercept on preceding scan lines. During the course of the processing, therefore, it is necessary to have the vector memory records of the currently scanned graphic elements arranged in a sequence corresponding to that in which they are encountered along the scan line. During the first stage of processing, termed Initialization Processing in FIG. 3, the vector memory is ordered into a forward and backward link list memory with the two ends of the memory corresponding to the left and right margins of the document scanned. Each vector record placed in the vector memory includes, as part of the record, the address of the next vector and the address of the preceding vector. During initialization processing the processor also brings the document up to the preselected starting scan line. For digitizing an entire document this will normally be the first scan line; however it is also envisaged that when editing a drawing one may wish to immediately skip up to a "window," part way down the page, and process only a small number of scan lines starting at that location.

As shown in FIG. 3, the next stage of operation of the invention is the Real Time Processing of a document. By "real time" is meant that the graphic information of the document is processed essentially at the speed with which the document is scanned, and the coded compacted information representative of topological and dimensional details appearing in the drawing are derived and output during such scanning. Thus there is no intermediate requirement of storing vast amounts of scan data, or of storing an intermediate body of derived data of lesser compactness for later data compression. All the information which can be derived from the graphics, is derived in the single pass operation and processing according to the present invention. During this second stage of processing, the L/R coordinate information of consecutive scan line intercepts is sequentially fetched from temporary registers storing that data, and undergoes a series of comparisons, smoothing and hole filling operations, and other processing as more fully explained below, resulting in the generation of coded output data. During the real time processing, vector records, each record comprising an ordered field, or sequence of words of different lengths, is synthesized, so as to retain sufficient information about the most recently scanned graphic elements to both develop a compact output code representative of such information, and to intelligently recognize nearby dimensional and topological features based on such accumulated records. As in the device of the above referenced application, these records remain available in storage so long as the information contained therein sufficiently represents the portion of the underlying graphic element being scanned. As in the prior device, when a material dimensional or topological change occurs, information from the record is output, and a new record commenced. The information which is caused to be output includes, for instance, a linear or "trapezoidal" approximation to the graphic element over a number of preceding scan lines, together with codes indicative of the topological branch point or connection of that element to other elements. This output information, which is many orders of magnitude more compact than the raw raster data, may then be stored for subsequent re-creation of the underlying document, or may be processed by follow-on software operated devices, in a manner to add intelligence to the document. One such subsequent processing approach is the performance of symbol recognition, as discussed in the cited application. In either case, the purpose of the processing is to produce the output data representative of the features scanned.

Since no output is developed until such time as a graphic element ends or is otherwise is not fully approximated by its stored vector memory record, in a final processing stage, denoted Termination Processing in FIG. 3, all graphic elements which have continued to the end of the selected number of scans are forced to generate appropriate outputs, completing the processing. This may occur for instance when the last scan line of a document is reached, and a particular element has continued unchanged, e.g. as a straight vertical line, since earlier in the scanning. Termination processing may also be invoked in the event one has initially selected a "window" from scan line S to S+K, when the scanner reaches the preselected bottom scan line.

It will be appreciated that because the purpose of the processor is to receive scanner information and to produce compactly coded digital outputs representative of the scanned document, the processor according to the present invention will typically be attached to a scanner or recorded source of scan information, and will typically deliver its output either to a recording device, or to a computer mediated device, such as a graphic work station, for synthesizing and editing the scanned document. Accordingly the initialization processing and termination processing may each include a number hand shaking procedures, in a manner known in the art, for interfacing with such devices.

Figure 4:
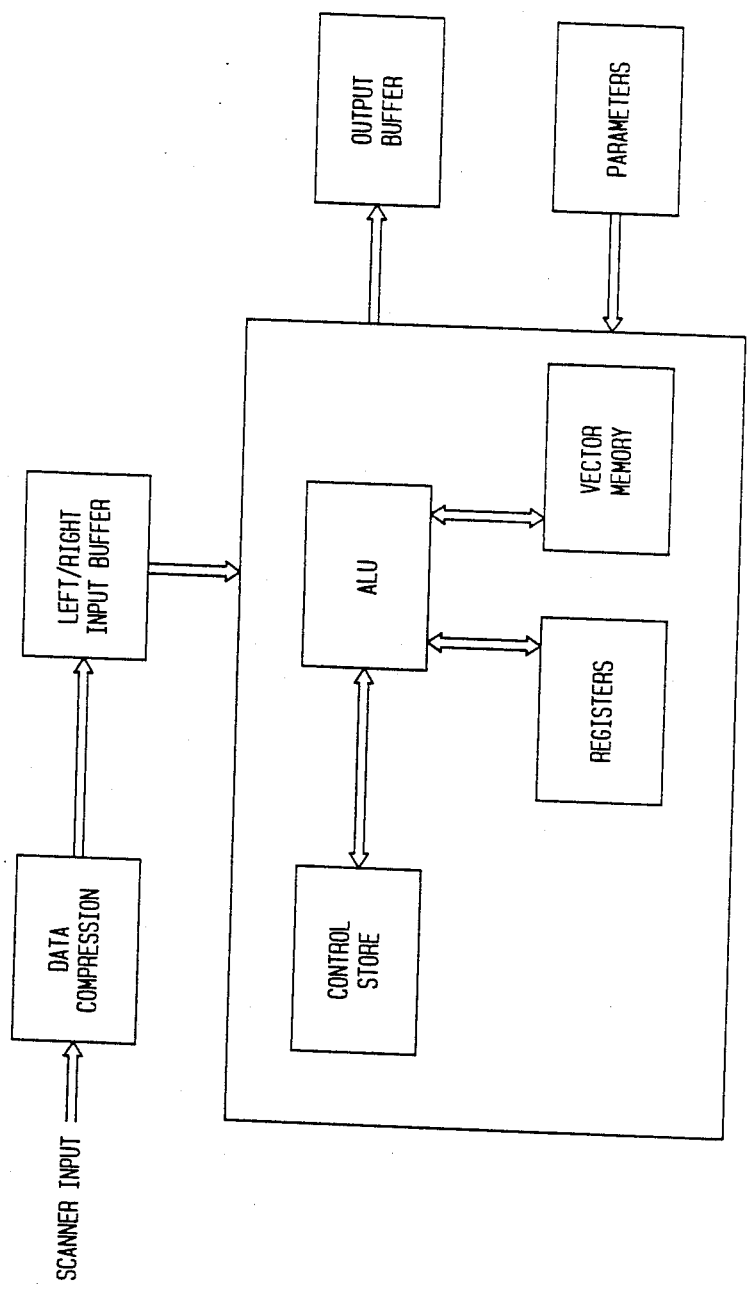
FIG. 4 shows a block diagram of the hardware components in one embodiment of the present invention.

Turning now to FIG. 4, there is shown a block diagram of the computer graphic digitizer according to the present invention. As shown, raw scan data, denoted scanner input, is fed to data compression circuitry, which extracts the coordinates of successive runs of like-valued scan information along the scan line. These coordinates may be for instance the left and right coordinates of the run, or the center coordinate and width, or all four such coordinates. In the preferred embodiment, the left and right coordinates are used as the compressed data. The compressed coordinates are fed to a left/right input buffer which can store the left/right coordinates of a number of successive intercepts. These are delivered, as needed, to the central processor which includes a vector memory, a number of temporary storage registers, an arithmetic logic unit for comparing coordinates and deriving information therefrom, and a control store unit which controls the sequence of operations performed on the incoming data and accesses necessary data for performing the required steps.

Processed data is then fed to an output buffer, whence it may pass either to a storage medium or to an appropriate follow-on processing device. The operation of the processor is variable in accordance with certain parameters which may be preset by the user. These parameters, listed in the appendices and discussed below in connection with the algorithm flow, include a parameter denoted FUZZ, selected according to the sharpness of the print lines, which determines the number of consecutive scan lines upon which a scanned feature must be confirmed before it is allowed to effect the output records. The variable input parameters also include dimensions of features which will be recognized as flyspecks or ink spots. These and other features will be discussed below in relation to the preferred embodiment which will now be discussed.

The preferred embodiment of the present invention uses an arithmetic logic unit which carries out instructions under the control of the control store for comparing incoming scanner coordinates with information contained in stored vector records and temporary registers. The precise hardware implementation is to a large extent a matter of choice, bearing in mind the design factors of cost, size, modular flexibility and ease of programming. In the preferred embodiment, an arithmetic logic unit capable of performing arithmetic and logic functions on 16 bit operands is used to perform operations according to instructions contained in a program memory. The particular instructions performed will vary, according to the perceived features of the data being scanned, in a manner determined by the program. In general, however, the ALU receives two numerical values and performs an operation to generate an output value which appears on the ALU output bus.

Certain comparisons of vector record and scan intercept coordinates are recognized as characteristic of particular topological conditions, e.g., branch junctions, which require a jump in the sequence of program instructions to a particular type of processing. Accordingly the ALU output bus is in communication with the sequencer control portion of the program memory via a status register, which is used to hold flags affecting the program sequence. For instance, the status register would include a flag bit to indicate if another left/right set of coordinates is ready from the scanner; and would also hold a flag bit indicating whether the instructions for hole filling should be temporarily inhibited from operation. Other flags, temporary computations, and global parameters will be further discussed in relation to the operation of the device, below.

The operating of the preferred embodiment is described in detail in the program captioned V3 ALGORITHM FLOW included in this disclosure. This program is an emulation of the processing according to a preferred embodiment of the present invention, of which the actual hardware implementation is described more fully in the file of this application below under the subheading GRAPHIC DIGITIZER. The V3 ALGORITH FLOW is written in a variant of Fortran 77, as will be understood by a computer programmer. The modifications to the basic Fortran 77 language involve the abbreviation of certain program steps, such as the instruction REPEAT . . . UNTIL, which correspond to similar constructs in a Pascal-like language. This is done to clarify the logical structure of the underlying method. Appearing in the right hand side of the V3 ALGORITHM FLOW chart, in double parentheses, are Arabic numerals which are inserted for convenience of reference in the following discussion.

Referring now to the FLOW chart, as shown at ((1)) thereof, the device operates by undertaking an initialization procedure in which the input processing pareters are stored for use in later stages of the processing. The specific parameters of the preferred embodiment appear under the sub-heading V3 PROCESSING PARAMETERS, and include the coordinates BSTART, BSTOP, RSTART, and RSTOP defining the left, right, top and bottom coordinates of a window to be scanned; MINWID, FUZZ, and other numerical values specifying the minimal dimensions of details which the processor will recognize as representing graphically significant features. Each of these parameters, and others, are more fully defined below under the sub-heading, V3 PROCESSING PARAMETERS. The reader is also referred to the additional sub-headings below entitled Vector File Format, Register Usage, this program. The Scanner Input Processor is initialized, and the Vector File Output Processor is also initialized.

Next the vector memory link list is initialized as shown at ((2)). The vector memory is a random access memory which, during the initialization, is ordered into a forward and backward link list. Vector memory location zero (V=0) is the left sentinel, and is used as an artificial vector indicative of the left side of the document. The only value in the V=0 record that needs to be initialized is NV, a pointer to the next vector, which initially is the right sentinel vector (V=1). The right sentinel vector is an artificial vector for the right side of the document, with preset left and right coordinate values (FFF0 hexadecimal) set to a number larger than the largest number that can be scanned by the input raster scanner. That is, the left and right edge coordinates (LR2 and RR2) of the right sentinel vector are fictitious. The PV (previous vector) field of the right sentinel is set to point at the left sentinel vector V=0. The free list pointer is initialized to the first available vector record number (V=2). The remainder of the vector memory records are then initialized to point to the next sequential vector record (NV(V)=V+1), except for the last record (V=MAXSEG). The NV field of V=MAXSEG is set to zero to terminate the free link list, and indicate that there are no more free vector records following V=MAXSEG.

Once the vector memory link list is initialized, the processor, as indicated at ((3)), reads input records from the left/right processor which, as discussed above, correspond to the coordinates of runs of like-valued pixels along the scan line. The LR processor is constructed to output a special end of scan sentinel for the right value of the last scan of the document. This value is FFF1 (hexadecimal); if this value occurs, the processor immediately goes into termination processing. Thus as shown at ((3)), if the scan number is less than the input parameter RSTART, the top coordinate of the window to be scanned, the algorithm reads left/right inputs according to the routine GETIPI (steps of which appear at ((60)) below). GETIPI reads the next left/right pair from the LR processor and stores the values in the registers LIP1 and RIP1. It also clips the left/right values, so that it only reports left/right values that are in the coordinate range BSTART to BSTOP, initially programmed. If the LR processor has detected the end of the document, termination processing is commenced; otherwise the scan line is incremented in this way until it reaches RSTART, the top of the preselected window. This completes Initialization Processing. The device then gets the next input to be processed, and commences Real Time Processing.

As shown in ((4)), Real Time Processing commences by the step NSTAGE, which determines how to process the input left/right pair. When an end of scan condition has been recognized during step NSTAGE, the current vector is reset to the left sentinel, the value in the register RIP1 is checked to determine if it is the end of a scan line (as opposed to the end of document signal discussed above) and the scan number is checked to see if it is the lower edge of the preset window, RSTOP. If not, the scan number is incremented by 1; as is the number in register SINC (which counts the number of scans elapsed since the last output record was made to the vector file); and the routine TSINC is called. (TSINC, appears at ((64)). In the embodiment under discussion, the maximum value of the scan number increment count which can be encoded in an output record is 13 bits (8191 scan lines); thus a scan increment record must be output at least every 8191 lines. TSINC simply checks to see if the register count SINC is that maximum value. If it is, the increment scan record is output to the output file. TSINC will generally be called before outputting records to the output file, as will appear below in relation to the further processing discussion.)

When, during Real Time Processing, the end of document sentinel is recognized, Termination Processing commences. In Termination Processing, as outlined at ((5)) and ((6)), it is still possible that active vectors in the vector memory need to be cleanly terminated and output records generated to adequately describe their vector segments. To do that, the current vector is set to zero (i.e. the left margin), and the remainder of the list, if any, is processed to output termination records. Different records are output according to the state of each vector still remaining in the vector memory. If the parameter NEW(V)=1, it means the vector just got started. In this case no output record is generated. If YJCNT(V) or LJCNT(V) (which terms are described below) are not equal to zero, then the vector was in the process of being tracked as a potential Y or L junction. Different records are output to indicate the coordinates of the vectors at the time of termination in those cases. Finally the end of file record is output to the output vector file and the processor stops. This completes the overview of the three stages of operation of the present invention.

The Real Time Processing of a graphic image will now be discussed. As noted above, the Real Time Processing according to the present invention is initiated by loading a set of LR coordinates into the LIP1 and RIP1 registers and proceeding to NSTAGE processing. In NSTAGE processing, as shown in ((7)), three arithmetic tests are performed to screen for the three conditions characteristic of the occurrence of a missing vector, a new vector, or the end of a scan line. If any one of the three conditions is true, the algorithm goes to the processing step for that condition (which are discussed commencing at ((53)), ((49)), and ((4)) respectively; otherwise the processing proceeds to SIMPLE OVERLAP processing discussed in relation to ((8)) below.

SIMPLE OVERLAP processing performs a series of arithmetic comparisons and calculations to recognize potential Y and L junctions, to update vector records, and to cause outputs to be made as necessary. The instructions for SIMPLE OVERLAP processing are executed as follows. The next left/right pair is input and the current vector is moved right to the next vector by using its NV pointer ((8)). A check is then performed ((9)) to determine if an L junction may be present. Quite simply, if the left coordinate of the intercept is less than epsilon to the right of the right coordinate of the preceding vector, then an L junction may be present and the L junction preprocessing steps, starting at ((18)) below, are executed. Otherwise the hole filler flag is set to 1, and a second arithmetic comparison is performed ((10)) to determine if the left coordinate of the next vector is within epsilon of the right coordinate of the preceding vector. If so a potential Y junction is recognized and the Y junction preprocessing steps are called as described starting at ((30.1)) below.

If the arithmetic tests of the appropriate left and right coordinates of the adjacent vector intercepts do not indicate either a potential L or Y junction, the processing proceeds to a series of prediction tests and parameter defining steps. Specifically, at ((10.1)) a center predictor CP(V) and an edge predictor EP(V) are updated. CI (the center of the input segment), is compared to CP(V) (the predicted center), and the corresponding EI is compared to EP(V) to check if the predicted center and extent closely match the actual center and extent of the scan line intercept. If either differs by more than a predetermined amount, which is a function of the threshold parameter TRO(V), the vector is considered to have changed significantly and goes to step DELST ((11)). At step DELST, if the number of elapsed scan lines since the start of the vector record for that graphic element is less than or equal to two, the change is not considered significant and processing proceeds to ((14)).

According to the processing scheme of the present invention, the center and edge predictors and various other parameters are updated in the vector memory record at each power to two, that is, after 2, 4, 8 etc. scan lines from the start of the record. POWERT simply checks whether DELS (the number of elapsed scan lines) is a power of two, and, if so, updates the various vector predictors according to the formula shown therein. It then loads the next power of two into a counter NXP2 for later use.

Continuing with discussion of ((11)), if the vector is a new vector (i.e., the parameter NEW(V) has been set equal to one by the steps appearing at ((49)) et seq. of New Segment processing) again the processor merely proceeds to update the parameters at POWERT. However if the center or edge predictors are outside of the threshold in ((10.1)) and neither of these two conditions holds, an output record is generated. If it is a new vector, a new vector record is output in the form indicated at ((12)). If the L junction count is not zero (that is if a potential L junction has been detected and is being processed as in steps ((18)) et. seq.) then an output record in the form shown at ((12.1)) is output. In addition an output continuation record ((13)) is output and a new vector record is started bearing the address of the vector which was just output. Thus, in the event that the L junction count is not zero, two output records are generated. This is done to preserve information about the vector shape in a manner which will depend upon the subsequent L junction processing, discussed below.

Finally, the simple overlap processing performs a squaring-off or flatness restoring operation on the coded data. Specifically, if the vector is a new vector and DELS is less than the preset parameter NEWTOP, then a check is made to see if the extent of the current intercept is greater than that of the new vector when initially encountered. If so the width of the top of the vector is reset to be equal to that of the present intercept. A check is made ((16)) whether the new vector is taller than FUZZ scan lines. If so, a new vector record is output. The form of this record will be three words if only FUZZ scan lines have elapsed, otherwise four words, with the fourth rod being DELS, the number of elapsed scan lines. By expressly putting out a code word indicative of DELS only when DELS is greater than the minimum, the volume of output data generated for detailed graphic images can be significantly reduced. Thus generally before an output record is generated, such an efficiency check is performed, below. In either case the record is output and the NEW(V) flag is set to false, or zero. The current left/right coordinates for the vector are updated and the MISSED(V) and LJCNT(V) are each set to zero, and processing proceeds to NSTAGE.

Thus it may be seen that NSTAGE processing, in the absence of a hole, an L or a Y junction, proceeds to update parameters in the vector memory and cause output records when the coordinates change by more than a threshold amount, in such a way that the vector memory always contains coordinates which provide a linear approximation of the most recently encountered graphic elements. The vector output flies contains similar data, as well as the branch point data, for all previously encountered and no longer currently scanned graphic elements.

Turning now to the FLOW chart for the L junction preprocessor, at ((18)) et seq., there are shown the processing steps undertaken when the arithmetic tests discussed in relation to ((9)), above, indicate a potential L junction. Step LJPRE first checks to see if a Y junction is currently being tracked above the current vector V. Normally a vector cannot simultaneously have a Y junction and an L junction, owing to the fundamental dimensional properties of drawings, and a simultaneous Y and L junction can be taken as indicative of noisy scan data. Rather than develop complex algorithms for recognizing such case and replicating it, the processing device of the present invention legislates away the possibility of concurrently having a Y and L junction. Thus if the Y junction count is nonzero, the processor proceeds to get LR coordinates of new intercepts and fill all holes until LIP1 is beyond the coordinate RSAVE (defined below and in Appendix 3). It then proceeds with the Y junction processing.

Next a hole recognizing and filling operation is undertaken ((19)). This is done in the L junction preprocessing steps, because a hole in a feature starts at a primitive point which looks like an L junction. It cannot be ascertained whether the L junction is real or possibly a hole, until the analysis of subsequent scan lines. Preset input parameters WIDHOL and TALHOL, representative of the preset maximum width and height limits of hole sizes that the algorithm fills, are arithmetically compared to the measured dimensions to determine whether the scanned feature may be a hole. The flag HFILL (V) is initialized to true (1) when the vector record is created, to indicated that hole filling is allowed on the vector. The algorithm checks to see if the L junction count or height of the L junction, (or height of the current hole, if it really is a hole) is less than TALHOL. If so the width of the hole is checked to determine if it is less than the maximum permissible hole width WIDHOL. If any of the tests fail, that is if the L junction being tracked is larger than the holes one is permitted to fill, the hole filling flag HFILL(V) is set to zero and the lambda junction preprocessing LJPRE2 is undertaken; however, if we do fill holes, the L junction height counter LJCNT(V) is incremented and certain cleanup processing is undertaken as described at ((23)) below.

During the L junction preprocessing, at ((20)), the L junction height counter is incremented. If this scan is the first encounter with the L junction, the left and right coordinates of the "junction surface", that is the common top surface to which the L junction legs are attached, are saved for later output to the vector file. If the L junction height is greater than the parameter FUZZ, then the L junction post processor is called forth to output L junction records to the vector file. However because an L junction may in fact have multiple legs depending from a common branch surface, the L junction preprocessing steps must continue to check subsequent adjacent vectors.

Thus at ((21)) a further arithmetic comparison is made to determine whether the gaps between the left/right pairs are greater than the maximum hole filler width parameter. If so, then the hole filler flag HFILL (V) is set to zero for each such vector. At (22) an arithmetical test is performed to determine whether the right leg of the L junction may be part of a potential Y junction. If so, a continue vector record is output, to preserve the vector shape, and processing proceeds to step SOL2 of the simple overlap processing. From there the flow of control may proceed to the Y junction preprocessor in a clear and well defined way. As a final step, ((23)) is a normal cleanup step for the L junction preprocessor before returning to NSTAGE processing. The center and extent predictors are updated, the MISSED(V) counter is cleared, and the left/right coordinate of the junction at this scan are saved in registers LR2(V) and RR2(V). The processor then recommences NSTAGE processing.

It will be recalled that when the L junction count exceeds FUZZ, the L junction post processing stages are executed. These stages are shown commencing at ((24)). The requirement that the L junction be confirmed for at least FUZZ lines allows the processor to effectively skip over potential L junction legs due to noise on the edge of lines, especially horizontal lines. Thus, features such as those shown at the bottom of FIG. 2 would be screened out by the L junction preprocessing assuming FUZZ 3, and would not lead to the generation of output records for the legs of a lambda junction. Of course if the parameter FUZZ is set to zero, then a level of sensitivity to such microscopic variations comparable to the prior invention of the previously cited application would be effected. However, as noted, for digitizing drawings such a threshold is unnecessarily sensitive.

FIG. 5 shows a magnified portion of a vector coming down from above having three legs and multiple fuzz-like imperfections. In that example, the left/right coordinates at scan number SJ describe a complete horizontal part of a vector with no exceptional qualities, which should be processed by the simple overlap code. At scan SJ+1 a potential L junction is recognized by the simple overlap processing and the instruction sequencer evokes the L junction preprocessor steps. If the parameter FUZZ is set to a value greater than zero, all of the left/right pairs under the line in scan SJ are processed by the L junction preprocessor. The same happens for scans SJ+2 and SJ+3, if the value of FUZZ is greater than or equal to 3. At scan SJ+4 (assuming FUZZ equals 3), the L junction preprocessor recognizes that it has been tracking the L junction for more than FUZZ scan lines by examining the value of LJCNT(V). The L junction preprocessor than calls the L junction post processor to output the L junction information to the vector output file.

Continuing with a discussion of the V3 ALGORITHM FLOW, the next processing steps are concerned with deleting the insignificant features under scan SJ so that they do not appear in the output records. At ((24)) a check is made to determine whether the top of the vector has been output to the vector file. If not, a new vector record is output. Thus the output processor will have a pre-existing entity (the vector record of the top) to which it can identify the records of the various legs subsequently to be output. Next, at ((25)), an output indicative of the L junction surface is made. As described at ((16)), a simple check is made to ascertain whether a three word or a four word output will yield a sufficient record, including the L junction count. This is done for purposes of efficiency. Next a leg record ((26)) is output to describe the coordinates and vector number of the left most leg of the L junction. In the example cited (FUZZ=3) the coordinates are measured at the scan number SJ+4. The vector memory record for the vector V is updated to indicate that it has a different starting point.

The processing next starts for the remaining legs of the L junction, according to ((27)). A new vector is allocated from the free list of the vector memory for each leg encountered ((28)) after the hole filling process. The new vector records are each initialized to indicate that the vector starts at the leg of the L junction, and an L junction leg record is output for each such right leg ((29)). If it is the last leg of the L junction the JT field of the output record is set to 3 otherwise 2. In this manner, both the position and significant topological features of the legs are compactly coded. Thus for any L junction the sequence of records output to the vector file will contain at least three L junction records, with different JT junction type values coded into the records. The JT values will be distinct for the junction surface, for the first and any middle legs, and for the rightmost leg. Finally in the post processing stage at ((30)) an arithmetic check of the type discussed at the end of the LJPRE1 step is performed, to ascertain whether there is an immediate Y junction on the right side of the L junction. If so, again the SOL2 processing leads cleanly into Y junction processing; otherwise the program returns to NSTAGE processing. This completes the L-junction processing stages.

It will be appreciated that the geometry of a Y junction is similar to that of an L junction; however when a document is scanned from top to bottom, and the scanned left/right coordinates analyzed for graphic information content, the separate legs of the Y junction will appear before the junction surface itself is scanned. Thus, in constrast to the L junction case, no particular processing is required to delay the output coding until holes have been distinguished from branch points. This asymmetry leads to different processing steps for the two junction types. The major source of ambiguity or noise in Y junction processing is the removal of "fuzz", consisting of graphic detail less than a predetermined number of scan lines in height. Another smoothing operation is "junction leveling", in which the branches of the Y are coded as terminating at a common junction surface, eliminating the microscopic irregularities which in fact characterise junctions on mechanically drawn drawings.

FIG. 6 shows a representative Y junction graphic element at a greatly magnified scale. As shown, a plurality of distinct branches or potential branches are scanned; there are three legitimate (tall) vectors coming down from above and multiple fictitious (short) vectors, all of which join together at a common Y junction. It is the purpose of the Y junction preprocessor to recognize short vectors (which represent fuzz) and delete them so that their information does not generate output records. Broadly, this is accomplished as follows: when a new segment is recognized (discussed at ((49)) below), a flag NEW(V) is set equal to 1. This flag is indicative that no output record has previously been generated for the scanned element. If the simple overlap processing discussed at ((10)) above determines that a potential Y junction situation exists, and if NEW(V) equals 1, then V is simply deleted according to the straight forward series of steps denoted DELV, appearing at ((63)) in the flow listing. A value of NEW(V)=1 means that the vector is shorter than the parameter FUZZ and is of no interest as far as a Y junction processing is concerned. Thus, after deleting, processing continues with the next vector in the link list NV(V), by going back to simple overlap processing as described by steps SOL1 at ((9)) above. However, if NEW(V)=0, the left branch has been previously scanned and may be significant. In that case the processor checks whether the next vector is a new vector. If so, then a clean up processing step compresses the intercepts under that (next) branch and deletes the vector representative of the right side, returning the processing to the steps of SOL2 discussed at ((10)) above, for further determination of whether a Y junction may still be present.

After the elimination of the fictitious Y branches, if there are at least two vectors that are tall enough to create a legitimate Y junction, the processing proceeds as at ((32)). As will be discussed below, there may be further Y branches to the right of the first two, which will be processed at a later point. At ((32)) the L junction count is examined to determine whether the vector V was being tracked as a potential L junction. If so, an output record is generated to preserve the shape of the vector. The Y junction count is then examined to determine whether this is the first time the vector was tracked as a Y junction.

If so, as shown at ((33)), the left/right coordinates of the vector from the last scan of the leg coordinates (that is the top of the vector just before it joins into the Y junction surface with the other vectors) are saved. These leg coordinates are saved in the positions of the vector memory fields denoted LR3(V) and RRe(V), which memory records are discussed below under the subheading VECTOR MEMORY RECORDS. The left/right values of the current input are also saved in the vector memory records LR2(V) and RR2(V), which are used for the left/right coordinate of the junction surface as the Y junction is ascertained. Otherwise (that is if this is not the first time the vector has appeared as part of a Y junction), the left/right coordinates of the vector from the last scan of the leg coordinates before it joins into a Y junction surface with other vectors is saved and the left/right coordinates of the junction surface are set equal to the left most and right most coordinates appearing in any of the junction surfaces scanned since the Y junction count became nonzero ((34)). Finally at ((35)) and ((36)) a check is made to determine whether this Y junction has been tracked for more than FUZZ scan lines. If so, a temporary value YFLAG is set equal to 1 for invoking the Y junction post processing steps to output the Y junction records. Otherwise, the junction count is incremented and certain memory data values for the vector are updated. A series of steps are then performed ((37)) to find and process all vectors to the right of the first two Y vectors just processed, so that they may be joined together as part of the common Y junction surface being tracked.

This junction surface processing proceeds in the following manner. The next vector in the link list is checked ((38)) to determine if it is a FUZZ vector. If not, several more checks are performed to determine whether it is being actively tracked as an L junction, in which case a continuation vector record is output to preserve the vector shape ((38)). If the Y junction count for this vector is FUZZ scan lines tall, YFLAG is set to 1 to call the Y junction post processor ((39)). Otherwise the Y junction count is updated ((40)) and if YJCNT(V) equals 1 then the left and right leg coordinates are saved in vector memory records LR3(V) and RRE(V). As before, the intercepts under the vector are then compressed and the entire vector deleted if it is a FUZZ vector (NEW(V)=1) as shown in ((41)). If it is not a FUZZ vector, the surface values for the junction surface are updated using the surface values of the left most vector in the junction (the record number stored in VSAV). Finally, ((42)) a check is made whether the left edge of the next vector is still less than the coordinate RSAVE. The Y junction preprocessing steps 37-42 continue until all potential branches of the Y have been identified. At this point ((43)) a check is performed to determined if the quantity YFLAG of ((39)) has been set equal to 1, indicative that the Y junction surface has been tracked and leveled for FUZZ number of scan lines. If so, the pointer V is reset to the first vector of the Y junction surface (VSAV) and the Y junction post processing steps ((44)) et seq. are evoked. Otherwise (that is if the Y junction did not persist for FUZZ number of scan lines) the processor reverts to NSTAGE processing.

The purpose of the Y junction post processor is to cause the output of a sequence of Y junction records that describe Y junction surface and each leg joined at the surface. The sequence of record output to the vector file contains at least three Y junction records with different JT value encoded into the records. The JT, or junction type, values are code numbers appearing in particular positions in the output record, as discussed below under the subheading VECTOR FILE FORMAT. Specifically different JT values are envisaged for the Y junction surface record, the first or left most leg (and possibly middle legs) records, and the right most leg record. The first Y junction post processing step outputs the Y junction surface record ((44)). Next, at ((45)) and ((46)), processing is undertaken to determine an output for the left most Y junction leg record. Several tests are used to determine if a three work output will suffice, or whether a four word output will be required. Another test determines if the top of the leg starts at the leg of an L junction, in which case a special $JT=1$ indication is used in the output record; otherwise $JT=2$. The vector memory record fields for the left most vector are then reinitialized.

Thereafter, at ((47)), these processing steps are repeated for each vector that is connected to the Y junction surface. The usual arithmetic comparison is performed to determine if each such vector is the last leg record that will be output. If it is, the output record JT field is set to a special code indicative of the right most Y leg; otherwise it is set to the code for intermediate or normal left leg output record. As each leg is processed and its output record generated, since only one vector will be used to represent the trunk of the Y junction, the routine DELV is called ((48)) to delete each of the vectors representing branches of the Y junction. In this manner, the left to right correspondence between actively scanned graphic elements and the ordered vector memory is preserved. A check is performed and this processing continues until the right most leg of the Y junction surface has been processed. The processing then returns to step NSTAGE, ((7)) for more processing. This completes the generation of output records for a detected Y junction.

It will be recalled that under normal circumstances the vector record field in memory comprises data derived from preceding scan intercepts of the graphic elements corresponding to that vector. However, if the graphic element has not previously appeared, there will be no vector in the ordered sequence of vector fields corresponding to a scanned intercept. This case is recognized by the arithmetic comparison discussed in NSTAGE processing ((7)) above, which is outlined in the FLOW chart at ((49)) et. seq. This processing, denoted New Segment Processing, is evoked when the top of a new vector is scanned for the first time. In this case the width of the intercept is tested, and if less than the preset parameter MINWID, the LR coordinates are discarded and processing reverts to NSTAGE processing. Otherwise a new vector is commenced using the sub-routine ADDV, at ((62)) below, in a fashion well known in the art. A new vector is fetched from the free list of vector memory records and most (but not all) of the vector memory record values are initialized as shown in ((50)). At this point, if the parameter FUZZ has been set to zero, indicating that no subsequent scan line confirmation will be required before generating output records, then an output record for a new segment is generated ((51)). Otherwise, the vector memory value NEW(V) is set to 1, or "true" to indicate that the top of the record started as a new vector but no record was output to the vector file. The use of this new vector flag has been discussed previously in relation to the earlier processing stages. The processor then gets the next left/right input from the LR processor and proceeds to the next stage ((52)). In this manner, when a graphic element for the first time intercepts a scan line, it is given a vector record and placed in the appropriate left/right order of graphic elements being scanned, so that upon its recurrence on subsequent scan lines the appropriate arithmetic comparisons outlined above can be performed in a straight forward way to extract the topological and dimensional data representative thereof.

It will be recalled that another of the three arithmetical tests performed during the NSTAGE processing of ((7)), was a test to determine whether a vector previously stored in memory simply failed to be scanned on the present scan line. This condition is indicated quite simply if the left edge of an intercept falls considerably (greater than epsilon) to the right of the right edge of the next vector in the vector memory. In this case, an output record should be generated indicative of the fact that the subject vector has terminated. However when graphic data is processed according to the present invention new vectors and junctions may not, as yet, have vector records associated with them, because of the manner in which intermediate processing occurs for the recognition of Y junctions, lambda junctions and for hole filling operations. Therefore, the relabeling of vectors and the generation of output records to be accomplished upon the occurrence of a missing vector must handle each of several following cases.

One possibility is that the vector started at the top of a new vector but an output has not been written to the vector file because the vector has not yet appeared for more than FUZZ scan lines. A second possibility is that the vector was being tracked as a potential L junction but had not occurred for greater than FUZZ scan lines. A third possibility is that the vector was being tracked as a Y junction. In this case it would not be simply FUZZ, and steps would be necessary to clean up the junction surface. Finally, if none of the above cases, the non-appearance of the vector at the preset scan line would indicate it would be a normal vector, that has simply terminated. In this case the number of missed lines is compared to a preselected parameter MAXMIS, which is used to definitely recognize terminated vectors.

Bearing in mind these four possibilities, the missing vector processing proceeds, according to the FLOW chart, as follows. First, the next vector is loaded ((53)). Then, ((54)), if the vector is new, the left and right coordinates are determined and the vector is squared off by taking the left most and right most coordinates of the intercepts, provided the L junction count is non-zero. If the width of the squared off vector is greater than the parameter WIDFLY (so that it is recognized as a thin horizontal line rather than a flyspeck), two vector records are output: a new vector record and an end vector record. As in the earlier output cases, several tests are made to determine if the more efficient three word record will suffice rather than the four word record. The routine DELV is then called to delete the vector record from vector memory and processing proceeds with NSTAGE processing once more.

If, however, an L junction was being tracked different steps are undertaken. In that case, when the vector fails to appear, it will correspond to FUZZ on the bottom end of a line. This is the fictitious lambda junction appearing at the bottom of FIG. 2, discussed earlier. In that case, it is only necessary to output an end vector record. A test is done to determine whether the three or four word output record format should be used. The vector is deleted from vector memory and processing proceeds to NSTAGE processing as shown in ((55)).

In the third case, when a Y junction was being tracked at the time the vector is missing, processing is more complicated. As shown at ((56)), a Y junction surface record is output, as is a sequence of additional records of each leg of the Y junction, in a manner substantially identical to that performed in the Y junction post processing steps discussed previously. An end vector record is output ((57)) for the left most vector in the Y junction. The vector is deleted from vector memory and processing returns to step NSTAGE.

Finally, if none of the above holds, that is if a normal vector has simply terminated, then the number of scan lines that the vector has been missed is incremented and compared with the parameter MAXMIS. As shown at ((58)), if this number is greater, an output end vector record is generated. Before outputting the end vector record a cosmetic processing step is undertaken. An arithmetical comparison is made to determine whether the bottom of the vector should be flattened. If the bottom of the vector is short (less than the parameter BOTMIN) and the bottom is narrower than the top, a different version of the end vector record is output. The vector is then deleted from vector memory and the processing returns to NSTAGE processing. Otherwise, that is if the vector has not failed to appear for greater than MAXMIS scan lines, the center and extent predictors for the next scan are incremented and the processing proceeds to the next stage.

This completes the discussion of the arithmetic steps performed and the processing according to the preferred embodiment of the invention. Further details defining the steps involved in getting left and right inputs, reordering the vector memory, deleting vectors and incrementing the scan output records are shown at ((60)) and ((64)), all of which are trivial programming routines which have been discussed earlier in relation to the operation of the preferred embodiment of the present device.

It will be noted from the above discussion particularly in connection with steps ((20)) and ((27))-((30)): in the case of an L junction and steps ((38)), ((44)), and ((47))-((48)) in the case of a Y junction, that this embodiment of the present invention utilizes a new principle in the encoding of scan data. Whereas the invention of the above-identified prior application treats a junction uniformly as a binary branch from a given point, the present invention treats a junction as something which may develop as a multiple-branched junction, i.e. having 2 or more braches, with a junction surface that is parallel to the direction of scan. Furthermore, it will be apparent that the treatment by the present invention of Y and L junctions is substantially symmetrical, so that comparable output records will be generated from scan data from a given document that is scanned either from the top down or the bottom up.

It will also be appreciated that the encoding of scanned graphic images with artifact rejection according to the method and apparatus of the present invention results in compact coding of significant dimensional and connectivity detail, without generation of spurious output records and without blurring of fine branch junction features. In a preferred embodiment, the parameters affecting sensitivity to detail such as FUZZ and MINWID, and affecting recognition of characteristic voids and spots, such as WIDHOL and TALHOL, are each entered by keyboard entry to suit the particular type of document being scanned. These artifact recognition parameters may also be adaptively defined, so that their precise value is determined from the data scanned.

GRAPHIC DIGITIZER

Figure 7:
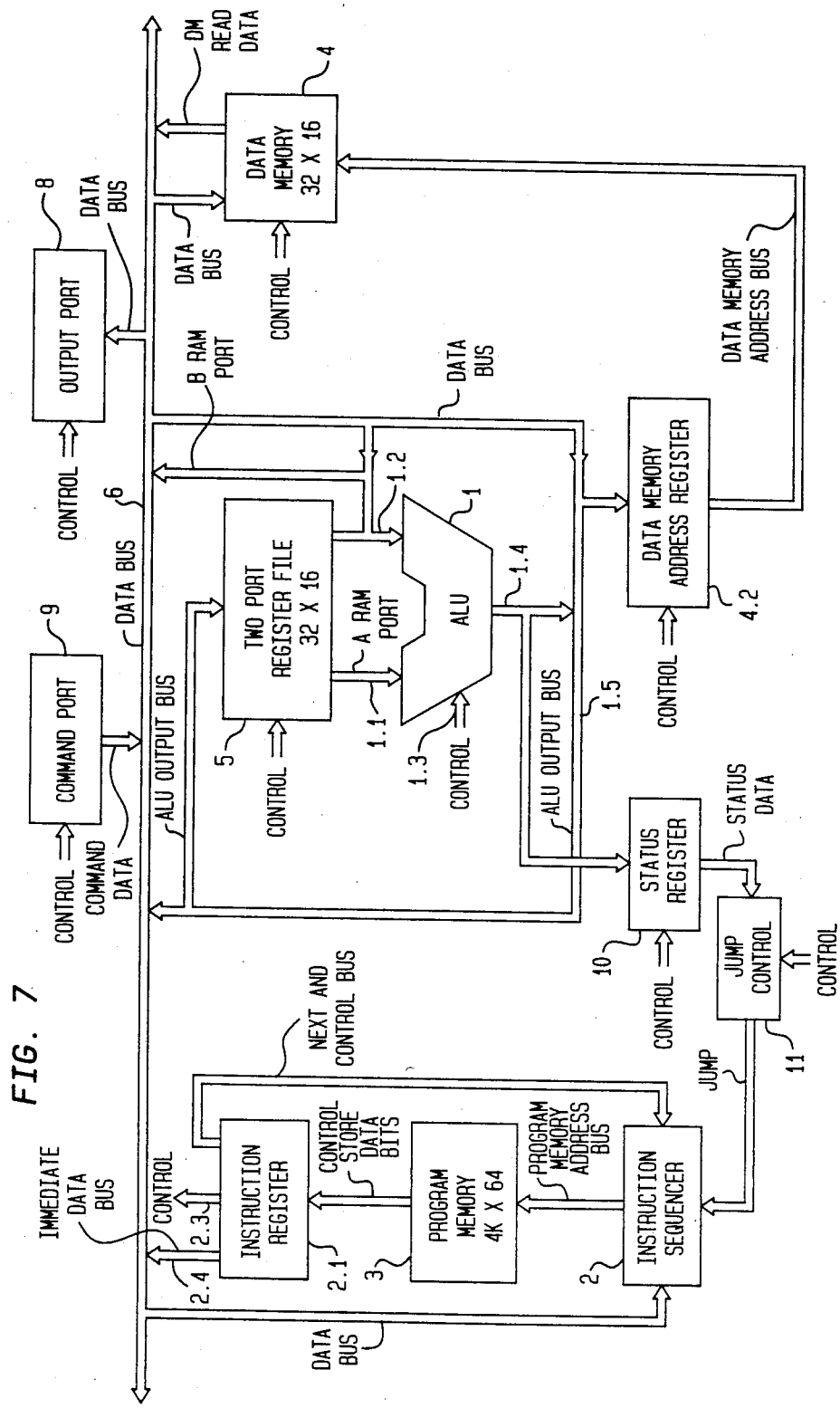
FIG. 7 shows a schematic representation of a preferred embodiment of a bitslice processor used to implement the present invention.
Figure 10:
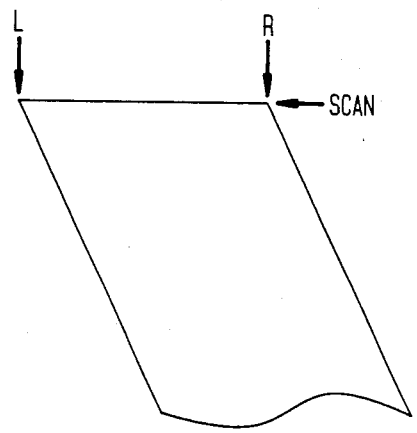
Figure 14:
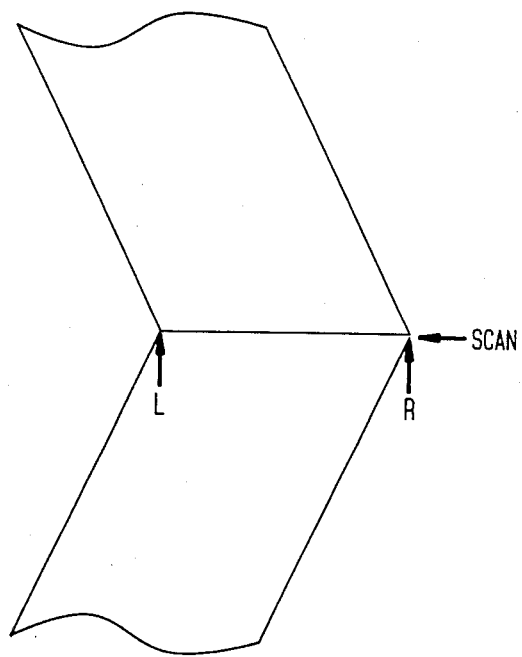
Figure 18:
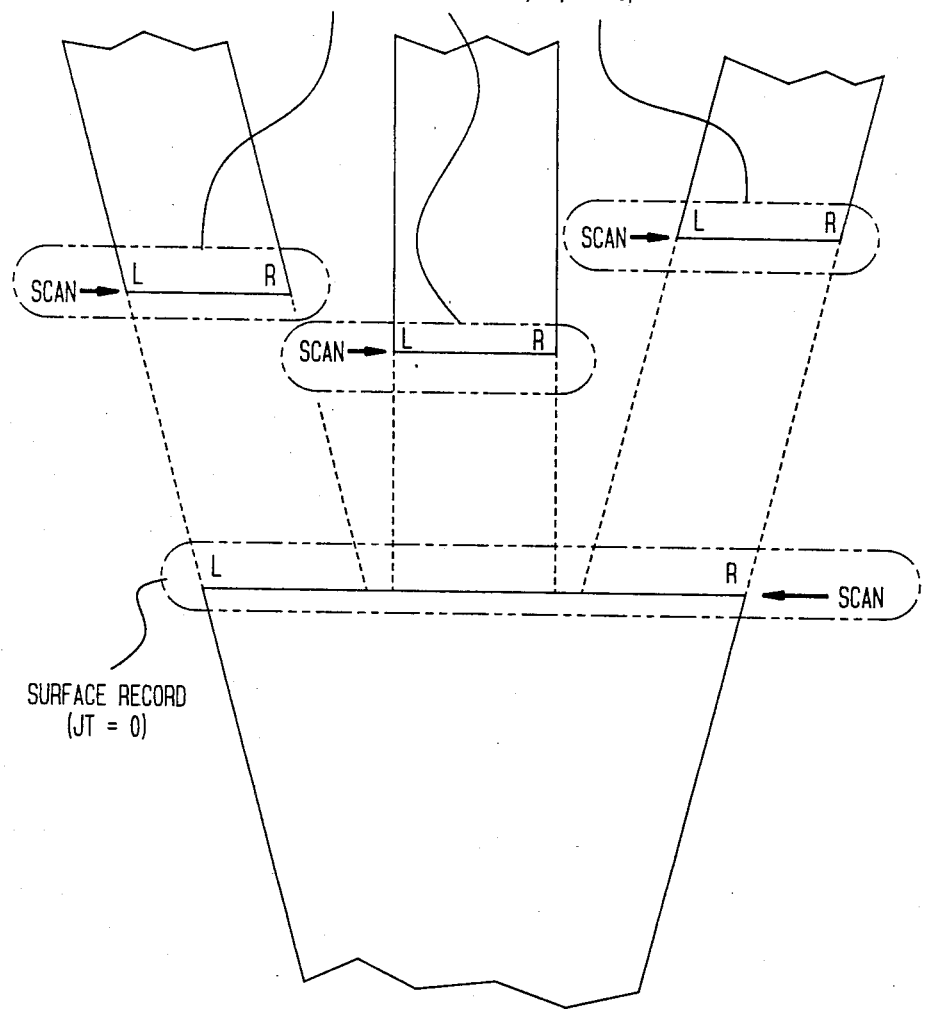
Figure 20:
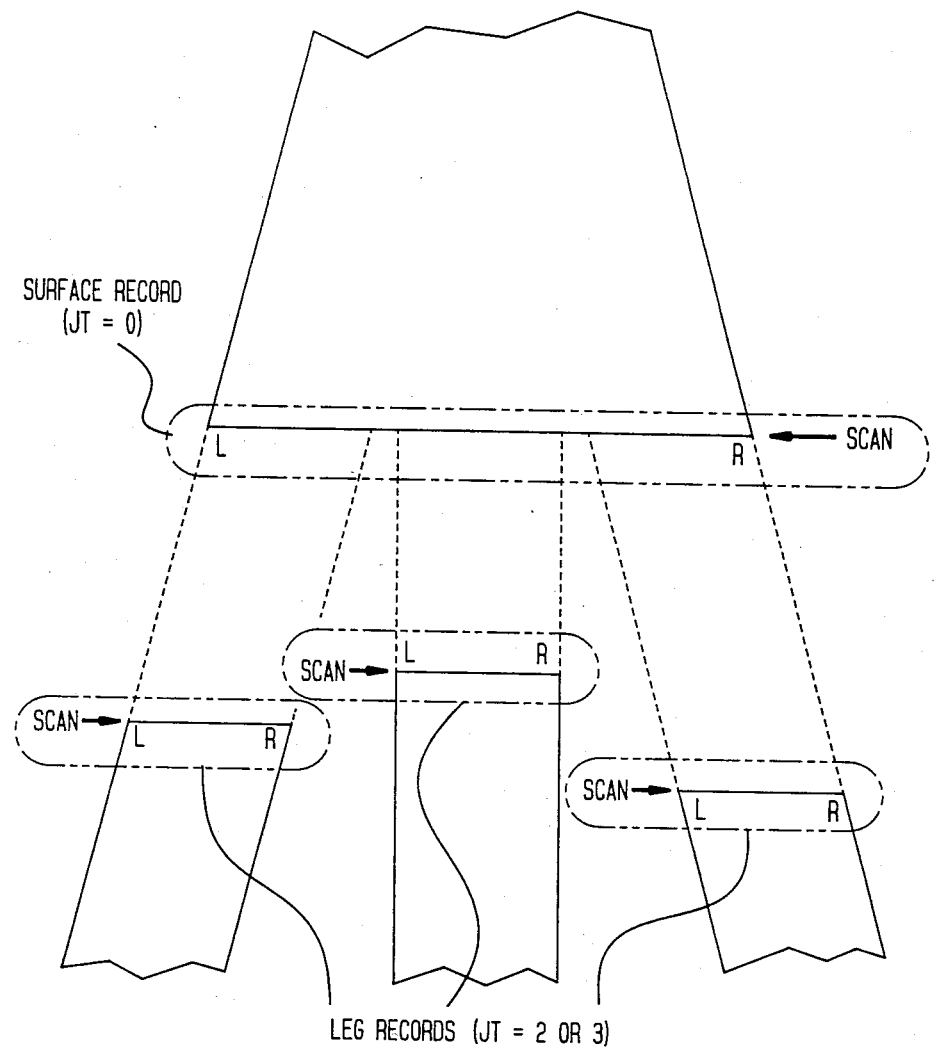

FIG. 7 shows a preferred embodiment of a bitslice processor used to implement the V3 algorithm. This is only one of many possible hardware implementations of the V3 algorithm. This implementation was based on cost, size, modular flexibility, and ease of programming. This is the main processor board (board 5) of the 6-board implementation of the V3 hardware.

The bitslice processor is a programmable processor that executes a sequence of pre-programmed steps stored in the program memory. This program is programmed in an assembly-like language similar to that of most general purpose computers. The major difference with this processor is that the support architecture has been tailored to make the V3 algorithm run efficiently in the processor. The support architecture includes the data paths (busses), registers, memory, and input/output facilities.

The major parts of FIG. 7 are: arithmetic logic unit (ALU) 1; program sequencer 2; program memory 3; data memory (vector memory) 4; general purpose registers 5; data busses 6; (input port); output port 8; and command port 9. What follows is a description of each section in detail and the relationship of the components to the V3 algorithm.

Arithmetic Logic Unit (ALU)

The ALU contains the circuitry necessary to perform arithmetic and logic functions on 16-bit operands. 16-bit words were selected because they yield values ranging from 0 to 65K. This permits processing of coordinates that go from 0 inches to 65 inches, assuming 1000 pixels per inch. This coordinate space is quite sufficient for the present applications. Using a shorter word length would not result in significant savings in costs or processing time. The 16-bit ALU is implemented using the Advanced Micro Devices, Inc. AMD-2903 bitslice processor chips. Even though the ALU is only 16 bits wide, it can perform more complex operations, such as 32-bit arithmetic, using multiple instructions of the ALU.

The particular functions the ALU can perform include: addition of 2 operands, subtraction of 2 operands, bit shifting operation (left/right) of one operand, logical functions (AND, OR, XOR, OR, NOR, NAND, etc.). The type of operation the ALU performs is decided by the program stored in program memory and may be different for each assembly-like instruction. The program sets the control signals 1.3 that control the ALU hardware.

The operands (sources of data) for the ALU are indicated at 1.1 and 1.2. The ALU gets its "left" value from 1.1 which is connected to the "two-port register file" 5. The register file contains 32 general purpose 16-bit words. These registers are used to hold temporary results of computations and the V3 processing parameters. (It will be discussed later how the parameters get copied to the general registers). The right value 1.2 for the ALU comes from the "data bus" 6 which is a data "highway" used in the machine to move data around. That is, the data bus can have several different sources for its data. It is important to understand that the data bus can have only one source of data at one instant of time, i.e., it is not possible to have 2 or more numbers on the data bus at once. The source of the data bus is determined by the program instructions that execute from the program memory, discussed below.

The result of the ALU operation 1.4 is then routed to the "ALU output bus" 1.5. Notice that the ALU output bus can be used to put new data back into one of the 32 general purpose registers 5. This allows use to evaluate arithmetic expressions that have more than 2 operands; of course it takes the processor (and program) more than 1 program instruction step to perform the complex evaluation; but it is the programmer's task to determine the type, order, and operands for the set of instructions. Also, one should note that the output of the ALU can be routed to the "data bus" 6 where multiple parts of the process can "read" the result of the ALU operation. Also notice that the result of the ALU operation can modify the status register 10 which we will discuss later.

Program Sequencer

The program sequencer is the part of the processor that initiates the execution of each program instruction. It does not compute numbers like the ALU, it just sets up the next assembly-like instruction that needs to be executed. It controls all of the electrical control signals that in turn control the operation of the rest of the processor components. There are two main components to the program sequencer: instruction sequencer 2 and instruction register 2.1.

The instruction sequencer contains the program counter (instruction counter) of the next instruction part is to be executed. It has the similar function as the "P" counter in most general purpose computers. The instruction counter is really an index pointer into the program memory 3 for the instruction that is to be executed. The current V3 bitslice implementation uses a memory that is 4K instructions deep. That is, the instruction counter is only 12 bits wide since it only needs to contain numbers (instruction addresses) from 0 to 4191. The program memory being 4K instructions mean that we have to implement (program) the V3 algorithm in 4K or less assembly language type instructions. In practice, the V3 algorithm is implemented in about 1.5K instructions, which leaves a lot of flexibility for expansion. (One should note that if more than 4K instructions were needed, the program memory size could be expanded without any major redesign of the rest of the processor.) Program memory will be discussed in greater detail below.

The instruction register 2.1 is a holding register (64 bits) which contains a copy of the current instruction being executed. The instruction register contents (bits) are used as control signal lines 2.3 to the rest of the processor components to execute the programmed instruction. Notice that is can also output part of the instruction register to the immediate data bus 2.4 so that we can program constants (fixed numbers) into the processor.

Program Memory

Program memory contains a maximum of 4K instructions for this implementation. Each word (instruction) of program memory contains 64 bits of information needed to control the processor for the instruction. The 64-bit instruction word is further divided into sub-words (or fields) that control specific parts of the processor, e.g., the ALU operation for addition, subtraction, etc. Note: the program memory can also be referred to as the control store memory.

The major fields of the program memory word are: ALU control (add, subtract, etc.), operand selection for the ALU (registers, data bus, etc.), ALU output destination (register, data bus, etc.), sequencer control (jumps, subroutines, etc.), input port control, output port control, command port control, and data memory control. Sequencer control is used to determine which instruction is to be executed next. Normally, the instructions execute serially. But the program may need to change the flow of control of the program based on the result of some other operation (such as the ALU). This capability is necessary for V3 processing steps such as "next stage" and any other port of the algorithm where the flow of control can be changed by arithmetic tests. The status register 10 output from the ALU allows the jump controller 11 to change the address of the next instruction based on ALU output. The status register contains information such as the sign of the ALU result (positive, negative, or zero) and other status information not associated with the ALU. Status register information (not associated with the ALU) includes a flat bit which indicates if another left/right value is ready from the scanner left/right processor (LR box).

Input, output, and command port control is used to read/write data from the outside word. The input port is used to read data from the left/right scanner processor (4K left/right buffer is not shown on this block diagram). The output port 8 is used to output data to the vector file buffer (16K word buffer is not shown on this block diagram. The buffer then outputs the vector file words to the VAX or APPOLO for storage on disk.) The command port 9 is used to read the V3 processing parameters from the VAX (or APOLLO) into the 32 general purpose registers 5.

Data memory control fields are used to control the read/write operation to data memory (vector memory).

Data Memory

The data memory is used for the bulk storage of the vector memory records. The memory contains 32K words, each word 16 bits wide. This is a linear memory (general purpose memory containing one value per word) rather than the horizontal (multiple values per word) memory structure that was used in the V2 hardware implementation. The linear memory is not much slower and it allows far greater programming flexibility (It should be noted that the size can be upgraded from 32K words to 64K words without any major redesign).

The data memory address register 4.2 contains the address of the memory word that is to be read/written. Note that this register can be set with the program and/or the output of the ALU. The data value to be read/written has its source/destination being the data bus 6.

VECTOR FILE FORMAT

The V3 vector file is a sequential stream of 16 bit integer words (similar to V2). The stream of 16 bit words are organized into variable length records. The top 3 significant bits of the first word of each record identify the record format (3 bits allows format numbers from 0 to 7). The format number is encoded as shown in FIG. 8. The format record types are:

| Format | Description |
| --- | --- |
| 0 | new vector record |
| 1 | end vector record |
| 2 | continuation vector record |
| 3 | increment scan number record |
| 4 | end of file record |
| 5 | Y junction record |
| 6 | L junction record |
| 7 | spare (not used) |

The remaining contents of the word are dependent on the format type. Most format records contain more than one 16 bit word of information. The number of following 16 bit words associated with the format record is dependent on the record type and the contents within the record. Reference is made to FIGS. 9–20.

REGISTER USAGE

The registers described here include global and temporary registers other than those documented in "V3 Processing Parameters" and "Vector Memory Records".

V: The current vector number being processed. This is the same number as the vector memory record number.

LI: The left coordinate of the current left/right input being processed in the raster scan line.

RI: The right coordinate of the current left/right input being processed in the raster scan line.

CI: The center of the current left/right input being processed in the raster scan line. CI is computed as:

$$CI = (LI + RI)/2$$

EI: The extent (width/2) of the current left/right input being processed in the raster scan line. EI is computed as:

$$EI = RI - CI$$

LIP1: Holding register for the next left input in the raster scan line. After the current left/right input (LI and RI) is processed, the value of LIP1 is moved to LI.

RIP1: Holding register for the next right input in the raster scan line. After the current left/right input (LI and RI) is processed, the value of RIP1 is moved to RI.

FREE: The vector memory record number of the next free vector. The value of free is the head pointer of a link list of unallocated vector memory records.

S: The current scan number. The value of S increments by 1 for each raster scan line.

SINC: The number of scans that have been processed since the last time a record was written to the vector output file.

MEXSEG: The highest vector record number. The current implementation has MAXSEG equal to 1023.

DELC: Used as temporary storage for the difference between the input center value (CI) and the predicted center value (CP).

DELE: Used as temporary storage for the difference between the input extent value (EI) and the predicted extent value (EP).

DELS: Used as temporary storage for the difference between the current scan number (S) and the top of the current vector (SRO).

SAVENV: Used as temporary storage for the vector memory value NV when vectors are added or deleted from the active list of vector memory records.

RSAVE: Used as temporary storage for the right coordinate of a vector plus the parameter EPS.

YCOUNT: Used as temporary storage for the vector memory value YJCNT of the current vector.

VSAV: Used ss temporary storage for the vector number of the leftmost leg of a Y junction.

YFLAG: Used as temporary flag to indicate that a Y junction has been recognized and needs to be output to the vector file.

HFFLAG: Used as temporary flag to indicate that the hole filling option was enabled for a vector during the processing of the L junction.

V3 PROCESSING PARAMETERS

V3 processing parameters are read by the V3 processor as part of the initialization part of the processing. After the parameters are initialized they are not changed by the processing steps of the V3 algorithm. They are used only in "read-only" mode.

BSTART: The starting left coordinate for the processing of the raster scan data.

BSTOP: The stop right coordinate for the processing of the raster scan data.

RSTART: The starting top scan number for the processing of the raster scan data.

RSTOP: The stop bottom scan number for the processing of the raster scan data. NOTE: Each raster scan line is processed from left to right (BSTART to BSTOP). Each raster line then in turn is processed from top to bottom (RSTART to RSTOP). See FIG. 21 for a schematic representation of the BSTART, BSTOP, RSTART and RSTOP parameters.

MINWID: Minimum vector width required before starting a new vector.

MAXMIS: Maximum number of scan lines to wait before terminating a missing vector and outputting and end record.

EPS: Maximum diagonal distance to look for connecting vectors from scan line to scan line. The value of EPS is only necessary to follow vectors for which data from successive scan lines do not overlap in at least one raster coordinate. (EPS is normally set to the value 1.) A value of EPS greater than or equal to 1 will connect a diagonal line only one raster scan unit wide, as shown in FIG. 22. A value of EPS greater than or equal to 2 would be necessary to fully connect the scan units in FIG. 23. The value of EPS is not used if the raster data overlaps from scan to scan, such as shown in FIG. 24.

MINTRO: Minimum threshold value to use for determining if a vector has significantly changed direction or width.

MAXTRO: Maximum threshold value to use for determining if a vector has significantly changed direction or width.

FUZZ: The height value (measured in scan lines) to use for determining fuzz. Also used as the maximum height difference for junction leveling.

WIDFLY: Fly spec width. If the total length of a vector is less than or equal to fuzz scan lines tall then the vector is a potential fly spec. If the vector width is less than or equal to WIDFLY then the vector is deemed to be a fly spec and is deleted.

WIDHOL: Maximum width for hole filling.

TALHOL: Maximum height for hole filling. See FIG. 25 for an example of hole filling. The dimensions of the hole shown in FIG. 25 are 4 by 5 scan units. If WIDHOL is greater than or equal to 4 and TALHOL is greater than or equal to 5, then the hole would be filled in by the V3 algorithm.

NEWTOP: Number of scans at the top of a new vector for flattening the vector. This is useful for flattening and squaring off the tops of rounded lines due to noise and the physical properties of ink on paper. For example, if NEWTOP=3, then the top of the vector on the left would be flattened to look like the vector on the right. (NEWTOP cannot be greater than FUZZ. If it is, the effective value of NEWTOP will be the value of FUZZ.) FIG. 26A shows the data before flattening, and FIG. 26B shows the data after flattening.

MINBOT: Number of scans at the bottom of a vector for flattening the vector. This is useful for flattening and squaring off the bottoms of rounded lines due to noise and the physical properties of ink on paper. For example, if MINBOT=3 then the bottom of the vector on the left would be flattened to look like the vector on the right. FIG. 27A shows the data before flattening, and FIG. 27B shows the data after flattening.

VECTOR MEMORY RECORDS

Vector memory contains information for currently active vectors. That is, the vectors that are being seen by the scanner from scan to scan will have a record of information stored in vector memory. The vector memory can store 1024 vector memory records of information. The vector memory locations are numbered 0 to 1023.

CR0: The center coordinate of the top of the vector.

ER0: The extent (half the width) of the top of the vector.

TR0: The threshold value used to determine if the vector has changed direction or width.

SR0: The scan number of the top of the vector.

LR2: The left coordinate of the vector at the current scan line.

RR2: The right coordinate of the vector at the current scan line.

LR3: Dual usage based on values LJCNT and YJCNT.
  NOTE: LNCNT and YJNCT are also values in the vector record.
  Usage 1: LJCNT greater than 0 means that the vector is being processed and tracked as an L junction. The value of LR3 is the left coordinate of the L junction surface.
  Usage 2: YJCNT greater than 0 means that the vector is being processed and tracked as part of a Y junction. The value of LR3 is the left coordinate of the top of the leg vector. NOTE: LJCNT and YJCNT cannot simultaneously be greater than zero.

RR3: Dual usage based on values LJCNT and YJCNT.
  NOTE: LJCNT and YJCNT are also values in the vector record.
  Usage 1: LJCNT greater than 0 means that the vector is being processed and tracked as an L junction. The value of RR# is the right coordinate of the L junction surface.
  Usage 2: YJCNT greater than 0 means that the vector is being processed and tracked as part of a Y junction. The value of RR# is the right coordinate of the top of the leg vector. NOTE: LJCNT and YJCNT cannot simultaneously be greater than zero.

LJCNT: Counter used to indicate that the vector is being processed and tracked as an L junction. If LJCNT=0, the vector is not being processed and tracked as an L junction. If LJCNT is greater than 0, then the vector is being processed and tracked as an L junction. The value of LJCNT counts the number of scans (height) the L junction has been processed. When LJCNT becomes greater than the parameter FUZZ, and L junction is formally recognized and output records created.

YJCNT: Counter used to indicate that the vector is being processed and tracked as a leg of a Y junction. If YJCNT=0 the vector is not being processed and tracked as a leg of a Y junction. If YJCNT is greater than 0, then the vector is being processed and tracked as a leg of a Y junction. The value of YJCNT counts the number of scans (height) the Y junction has been processed. When YJCNT becomes greater than the parameter FUZZ a Y junction is formally recognized and output records created.

MISSED: Counts the number of scans the vector has not seen. When MISSED becomes greater than the parameter MAXMIS the vector is considered to have ended.

DC: The Delta change in direction (center) of the vector (measured per scan line). A value of 2 means that the center of the vector is moving 2 scanner units to the right for every complete scan line. A negative value indicates that the center is moving to the left. The value of DC can be interpreted as the slope of the vector.

CP: The predicted center of the vector for the scan line. The value of CP is compared with the actual center of the vector for the scan line. If the difference is greater than a threshold (record value TR0) the vector is determined to have changed direction and a continuation vector record is output to the vector file. At each scan line the new value of CP is computed as the old value of CP plus DC:

$$CP = CP + DC$$

DE: The Delta change in extent (extent=width/2) of the vector (measured per scan line). A value of 1 means that the extent of the vector is growing 1 scanner unit for every complete scan line. A negative value indicates that the width of the vector is becoming narrower.

EP: The predicted extent (extent=width/2) of the vector for the scan line. The value of EP is compared with the actual extent of the vector for the scan line. If the difference is greater than a threshold (record value TR0/2) the vector is determined to have significantly changed in width and a continuation vector record is output to the vector line. At each scan line the new value of EP is computed as the old value of EP plus DE:

$$ti\ EP = EP + DE$$

PV: Vector record number of the previous vector in the link list of vector memory. Vectors are organized in the link list such that the previous vector is to the left of the vector on the scan line.

NV: Vector record number of the next vector in the link list of the vector memory, vectors are organized in the link list such that the next vector is to the right of the vector on the scan line. If the vector is not currently being used (on the free list of vectors) the value of NV is the next free vector in the list of free vectors.

NEW: Flag used to indicate that the top of the current vector started as a new vector.
  NEW=1: the top of the vector started as a new vector and a new vector record has not been output to the vector file.
  NEW=0: the top of the vector has been output as a record to the vector file.

FILL: Flag used to indicate that the L junction being processed and tracked as part of this vector may be a potential hole and may be filled in by the algorithm.
  HFILL=1: the L junction is potentially a hole.
  HFILL=0: the L junction is not a potential hole.

EXP2: Counter used to store that next power of 2 scan height for which the center and extent predicators (CP, DC, EP, DE) values are to be updated.

LNEW: If the value of new is equal to 1, the value of LNEW is the left coordinate of the top of the new vector.

RNEW: If the value of new is equal to 1, the value of RNEW is the right coordinate of the top of the new vector.

What is claimed is:

1. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:
  data compression means for extracting coordinates of a run of like-valued signals along a scan line;
  correlating means for correlating coordinates for a given run from the data compression means with a new or previously scanned vector;
  vector memory means (i) for storing data pertaining to each vector with respect to which the correlating means has correlated run data and (ii) for storing in an ordered sequence during encoding, vector records, each record containing data representative of the image scanned on at least one preceding scan line;
  processing means, operative on coordinates of the given run and on data read from the vector memory means related to a correlated vector, for determining whether the given run's coordinates define a continuation of the correlated vector to within a prescribed degree of accuracy;
  clearing means for clearing the data related to the correlated vector from the vector memory means when the processing means determines that the given run's coordinates do not represent a continuation of the vector to within the prescribed degree of accuracy and for causing data corresponding to the correlated vector to be given as an output;
  arithmetic logic means, for comparing the data output from the clearing means with data from corresponding vector records to determine the occurrence of branch junctions and generate data representative thereof;
  control means, in communication with the arithmetic logic means and with the vector memory means, for causing the outputs of output records, including data from vector records and branch junction data, when the arithmetic logic means has determined the occurrence of a branch junction; and
  artifact removal means, in communication with the arithmetic logic means, for removing artifact irregularities in the graphic image having at least one dimension smaller than a threshold, so that information derived from scanning such irregularities does not appear in the output records;
  fuzz elimination means, for suppressing from being output data representative of a graphic feature which branches out from another scanned feature for less than a number of scan lines corresponding to the threshold.

2. An apparatus according to claim 1, wherein the apparatus includes means for setting the threshold, so that the sensitivity of the apparatus may be set in accordance with the size of the artifacts characteristic of the graphic image being processed.

3. An apparatus according to claim 1, further including means for squaring off irregularities of height less than the threshold occurring at the end of a scanned vector.

4. An apparatus according to claim 1, wherein the apparatus includes means for adaptively defining the threshold so that the dimensions of features rejected as artifact are determined by the dimensions of features scanned on the document.

5. An apparatus according to claim 1, further including junction leveling means for determining when there occur within the threshold number of scan lines a multiplicity of branches from a common junction surface and, in that event, for encoding a representation of the common junction surface.

6. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:
  data compression means for extracting coordinates of a run of like-valued signals along a scan line;
  correlating means for correlating coordinates for a given run from the data compression means with a new or previously scanned vector;
  vector memory means (i) for storing data pertaining to each vector with respect to which the correlating means has correlated run data and (ii) for storing in an ordered sequence during encoding, vector records, each record containing data representative of the image scanned on at least one preceding scan line;
  processing means, operative on coordinates of the given run and on data read from the vector memory means related to a correlated vector, for determining whether the given run's coordinates define a continuation of the correlated vector to within a prescribed degree of accuracy;
  clearing means for clearing the data related to the correlated vector from the vector memory means when the processing means determines that the given run's coordinates do not represent a continuation of the vector to within the prescribed degree of accuracy and for causing data corresponding to the correlated vector to be given as an output;
  arithmetic logic means, for comparing the data output from the clearing means with data from corresponding vector records to determine the occurrence of branch junctions and generate data representative thereof;

control means, in communication with the arithmetic logic means and with the vector memory means for causing the output of output records, including data from vector records and branch junction data, when the arithmetic logic means has determined the occurrence of a branch junction;

artifact removal means, in communication with the arithmetic logic means, for removing artifact irregularities in the graphic image having at least one dimension smaller than a threshold, so that information derived from scanning such irregularities does not appear in the output records, the artifact removal means including means for determining whether a feature being scanned is noise of a type characteristic of the image being scanned and, in that case, eliminating data corresponding to such artifact from the encoded record; and means for preserving data related to the notch of a downward branching junction for successive scan lines until it has been determined whether the junction is the top of a hole, and means for filling the hole and deleting such branch junction data in that case.

7. An apparatus according to claim 6, wherein the hole-filling means includes means for receiving scan data derived from subsequent scans of the notch and for examining that data to determine whether the notch has a height and width within predetermined hole height and width limits.

8. An apparatus according to claim 7, wherein the control means includes means to deliver an output record containing the preserved junction data in the event the hole-filling means determines that the junction is not a hole.

9. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting coordinates of a run of like-valued signals along a scan line;

correlating means for correlating coordinates for a given run from the data compression means with a new or previously scanned vector;

vector memory means (i) for storing data pertaining to each vector with respect to which the correlating means has correlated run data and (ii) for storing in an ordered sequence during encoding, vector records, each record containing data representative of the image scanned on at least one preceding scan line;

processing means, operative on coordinates of the given run and on data read from the vector memory means related to a correlated vector, for determining whether the given run's coordinates define a continuation of the correlated vector to within a prescribed degree of accuracy;

clearing means for clearing the data related to the correlated vector from the vector memory means when the processing means determines that the given run's coordinates do not represent a continuation of the vector to within the prescribed degree of accuracy and for causing data corresponding to the correlated vector to be given as an output;

arithmetic logic means, for comparing the data output from the clearing means with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

artifact removal means, in communication with the arithmetic logic means, for removing artifact irregularities in the graphic image having at least one dimension smaller than a threshold, so that information derived from scanning such irregularities does not appear in the output records, the artifact removal means including means for determining whether a feature being scanned is noise of a type characteristic of the image being scanned and, in that case, eliminating data corresponding to such artifact from the encoded record; and flyspeck removal means for determining when a vector is of a width less than a width threshold characteristic of flyspecks and is of height less than a height threshold.

10. An apparatus according to claim 9, wherein the artifact removal means includes means for removing artifact irregularities in the graphic image having a height smaller than a height threshold.

11. An apparatus operative on input signals representative of coordinates of intercepts, along substantially parallel scans, of a two-dimensional image, for encoding the graphic information therein by generation of a series of output records representative of significant graphic data, such data including branch junction type and coordinate data, the apparatus comprising:

data compression means for extracting coordinates of a run of like-valued signals along a scan line;

correlating means for correlating coordinates for a given run from the data compression means with a new or previously scanned vector;

vector memory means (i) for storing data pertaining to each vector with respect to which the correlating means has correlated run data and (ii) for storing in an ordered sequence during encoding, vector records, each record containing data representative of the image scanned on at least one preceding scan line;

processing means, operative on coordinates of the given run and on data read from the vector memory means related to a correlated vector, for determining whether the given run's coordinates define a continuation of the correlated vector to within a prescribed degree of accuracy;

clearing means for clearing the data related to the correlated vector from the vector memory means when the processing means determines that the given run's coordinates do not represent a continuation of the vector to within the prescribed degree of accuracy and for causing data corresponding to the correlated vector to be given as an output;

arithmetic logic means, for comparing the data output from the clearing means with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction; and junction surface identification means, in communication with the arithmetic logic means, for determining when a multiple branched junction has been scanned and, in such event, for causing the output of an output record representative of a common junction surface for such junction, the junction surface identification means including junction leveling means for determining when there occur within a threshold number of scan lines a multiplicity of branches from a common junction surface.

12. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting coordinates of a run of like-valued signals along a scan line;

correlating means for correlating coordinates for a given run from the data compression means with a new or previously scanned vector;

vector memory means (i) for storing data pertaining to each vector with respect to which the correlating means has correlated run data and (ii) for storing in an ordered sequence during encoding, vector records, each record containing data representative of the image scanned on at least one preceding scan line;

processing means, operative on coordinates of the given run and on data read from the vector memory means related to a correlated vector, for determining whether the given run's coordinates define a continuation of the correlated vector to within a prescribed degree of accuracy;

clearing means for clearing the data related to the correlated vector from the vector memory means when the processing means determines that the given run's coordinates do not represent a continuation of the vector to within the prescribed degree of accuracy and for causing data corresponding to the correlated vector to be given as an output;

arithmetic logic means, for comparing the data output from the clearing means with data from corresponding vector records to determine the occurrence of branch junctions and generate data representative thereof;

control means, in communication with the arithmetic logic means and with the vector memory, for causing the output of output records, including data from vector records and branch junction data, when the arithmetic logic means has determined the occurrence of a branch junction;

junction surface identification means, in communication with the arithmetic logic means for determining when a multiple branched junction has been scanned and, in such event, for causing the output of an output record representative of a common junction surface for such junction; and artifact removal means, in communication with the arithmetic logic means, for removing artifact irregularities in the graphic image having at least one dimension smaller than a threshold, so that information derived from scanning such irregularities does not appear in the output records, the artifact removal means including fuzz elimination means for suppressing from being output data representative of a graphic feature which branches out from another scanned feature for less than a number of scan lines corresponding to the threshold.

13. An apparatus according to claim 12, wherein the apparatus includes means for setting the threshold, so that the sensitivity of the apparatus may be set in accordance with the size of the artifacts characteristic of the graphic image being processed.

14. An apparatus according to claim 12, further including means for squaring off irregularities of height less than the threshold occurring at the end of a scanned vector.

15. An apparatus according to claim 12, wherein the apparatus includes means for adaptively defining the threshold so that the dimension of features rejected as artifact are determined by the dimensions of features scanned on the document.

16. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting from such data coordinates descriptive of each run of consecutive like-valued signals in a scan line, such coordinates being indicative of the width and location on such scan line of the runs; and processing means operative on the coordinates for representing the scanned image field invariably and where (i) each of the two parallel sides of each trapezoid in the approximation is coincident with a scan line; (ii) the other two sides of each trapezoid are not necessarily parallel to one another; and (iii) the number of scan line lines between the two parallel sides of each trapezoid is determined directly from processing the coordinate data and is not necessarily an integral multiple of a fixed integer greater than one;

vector memory means, for storing in an ordered sequence during encoding, vector records, each record containing data representative of the image scanned on at least one preceding scan line;

arithmetic logic means, for comparing the input signals representative of coordinates of the scanned image with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

artifact removal means, in communication with the arithmetic logic means, for removing artifact irregularities in the graphic image having at least one dimension smaller than a threshold, so that information derived from scanning such irregularities does not appear in the output records; and fuzz elimination means, for suppressing from being output data representative of a graphic feature which branches out from another scanned feature for less than a number of scan lines corresponding to the threshold.

17. An apparatus according to claim 16, wherein the apparatus includes means for setting the threshold, so that the sensitivity of the apparatus may be set in accordance with the size of the artifacts characteristic of the graphic image being processed.

18. An apparatus according to claim 16, further including means for squaring off irregularities of height less than the threshold occurring at the end of a scanned vector.

19. An apparatus according to claim 16, wherein the apparatus includes means for adaptively defining the threshold so that the dimensions of features rejected as artifact are determined by the dimensions of features scanned on the document.

20. An apparatus according to claim 16, further including junction leveling means for determining when there occur within the threshold number of scan lines a multiplicity of branches from a common junction surface and, in that event, for encoding a representation of the common junction surface.

21. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting from such data coordinates descriptive of each run of consecutive like-valued signals in a scan line, such coordinates being indicative of the width and location on such scan line of the runs; and processing means operative on the coordinates for representing the scanned image field invariably and where (i) each of the two parallel sides of each trapezoid in the approximation is coincident with a scan line; (ii) the other two sides of each trapezoid are not necessarily parallel to one another; and (iii) the number of scan line lines between the two parallel sides of each trapezoid is determined directly from processing the coordinate data and is not necessarily an integral multiple of a fixed integer greater than one;

vector memory means for storing in an ordered sequence during encoding, vector records, each record containing data representative of the image scanned on at least one preceding scan line;

arithmetic logic means for comparing the input signals representative of coordinates of the scanned image with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

artifact removal means, in communiction with the arithmetic logic means, for removing artifact irregularities in the graphic image having at least one dimension smaller than a threshold, so that information derived from scanning such irregularities does not appear in the output records; and means for preserving data related to the notch of a downward branching junction for successive scan lines until it has determined whether the junction is the top of a hole, and means for filling the hole and deleting such branch junction data in that case.

22. An apparatus according to claim 21, wherein the hole-filling means includes means for receiving scan data derived from subsequent scans of the notch and for examining that data to determine whether the notch has a height and width within predetermined hole height and width limits.

23. An apparatus according to claim 22, wherein the control means includes means to deliver an output record containing the preserved junction data in the event the hole-filling means determines that the junction is not a hole.

24. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting from such data coordinates descriptive of each run of consecutive like-valued signals in a scan line, such coordinates being indicative of the width and location on such scan line of the runs; and processing means operative on the coordinates for representing the scanned image field invariably and where (i) each of the two parallel sides of each trapezoid in the approximation is coincident with a scan line; (ii) the other two sides of each trapezoid are not necessarily parallel to one another; and (iii) the number of scan line lines between the two parallel sides of each trapezoid is determined directly from processing the coordinate data and is not necessarily an integral multiple of a fixed integer greater than one;

vector memory means, for storing in an ordered sequence during encoding, vector records, each record containing data representative of the image scanned on at least one preceding scan line;

arithmetic logic means, for comparing the input signals representative of coordinates of the scanned image with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

artifact removal means, in communication with the arithmetic logic means, for removing artifact irregularities in the graphic image having at least one dimension smaller than a threshold, so that information derived from scanning such irregularities does not appear in the output records, the artifact removal means including means for determining whether a feature being scanned is noise of a type characteristic of the image being scanned and, in that case, eliminating data corresponding to such artifact from the encoded record; and flyspeck removal means for determining when a vector is of a width less than a width threshold characteristic of flyspecks and is of height less than a height threshold.

25. An apparatus according to claim 24, wherein the artifact removal means includes means for removing artifact irregularities in the graphic image having a height smaller than a height threshold.

26. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting from such data, coordinates descriptive of each run of consecutive like-valued signals in a scan line, such coordinates being indicative of the width and location on such scan line of the runs; and processing means operative on the coordinates for representing the scanned image field invariably and where (i) each of the two parallel sides of each trapezoid in the approximation is coincident with a scan line; (ii) the other two sides of each trapezoid are not necessarily parallel to one another; and (iii) the number of scan line lines between the two parallel sides of each trapezoid is determined directly from processing the coordinate data and is not necessarily an integral multiple of a fixed integer greater than one;

vector memory means for storing in an ordered sequence during encoding, vector records, each record containing data representative of the image scanned on at least one preceding scan line;

arithmetic logic means for comparing the input signals representative of coordinate of the scanned image with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

junction surface identification means, in communication with the arithmetic logic means, for determining when a multiple branched junction has been scanned and, in such event, for causing the output of an output record representative of a common junction surface for such junction, the junction surface identification means including junction leveling means for determining when there occur within a threshold number of scan lines a multiplicity of branches from a common junction surface.

27. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting from such data coordinates descriptive of each run of consecutive like-valued signals in a scan line, such coordinates being indicative of the width and location on such scan line of the runs;

processing means operative on the coordinates for representing the scanned image field invariably and where (i) each of the two parallel sides of each trapezoid in the approximation is coincident with a scan line; (ii) the other two sides of each trapezoid are not necessarily parallel to one another; and (iii) the number of scan line lines between the two parallel sides of each trapezoid is determined directly from processing the coordinate data and is not necessarily an integral multiple of a fixed integer greater than one;

vector memory means for storing in an ordered sequence during encoding, vector records, each record containing data representative of the image scanned on at least one preceding scan line;

arithmetic logic means for comparing the input signals representative of coordinates of the scanned image with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

junction surface identification means, in communication with the arithmetic logic means, for determining when a multiple branched junction has been scanned and, in such event, for causing the output of an output record representative of a common junction surface for such junction; and artifact removal means, in communication with the arithmetic logic means, for removing artifact irregularities in the graphic image having at least one dimension smaller than a threshold, so that information derived from scanning such irregularities does not appear in the output records, the artifact removal means including fuzz elimination means for suppressing from being output data representative of a graphic feature which branches out from another scanned featue for less than a number of scan lines corresponding to the threshold.

28. An apparatus according to claim 27, wherein the apparatus includes means for setting the threshold, so that the sensitivity of the apparatus may be set in accordance with the size of the artifacts characteristic of the graphic image being processed.

29. An apparatus according to claim 27, further including means for squaring off iregularities of height less than the threshold occurring at the end of a scanned vector.

30. An apparatus according to claim 27, wherein the apparatus includes means for adaptively defining the threshold so that the dimension of features rejected as artifact are determined by the dimensions of features scanned on the document.

31. An apparatus operative on input signals representative of coordinates of intercepts, along substantially parallel scans, of a two-dimensional image, for encoding the graphic information therein by generation of a series of output records representative of significant graphic data, such data including branch junction type and coordinate data, the apparatus comprising:

data compression means for extracting coordinates of a run of consecutive like-valued signals along a scan line, such coordinates being indicative of the width and location on such scan line of the run;

memory means for storing at a given time blocks of processed data, each block related to a single vector which has been previously scanned, and such data including for each vector, a coordinate pair descriptive of the width and location of the vector at an initial scan line of which the vector first occurs and a coordinate pair descriptive of the width and location of the vector at the scan line of which data pertaining to the vector was last obtained;

slope calculation means for calculating on a recurring basis the average rate of change per scan line of each of the coordinate pairs over the length of the vector;

prediction means, using data from the slope calculation means, for predicting the coordinates descriptive of the width and location of a run of like-valued signals applicable to a vector on a current scan line; and connectivity means for determining whether the coordinates descriptive of a given run are predicted within a prescribed measure of accuracy by the prediction means using data from the application of the slope calculation means to a given vector in the memory means and, in the event of a prediction within the prescribed measure of accuracy, for updating the data for the given vector in the memory means;

vector memory means for storing in an ordered sequence during encoding, vector records, each record containing data representative of the image scanned on at least one preceding scan line;

arithmetic logic means for comparing the data output from the clearing means with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

artifact removal means, in communication with the arithmetic logic means, for removing artifact irregularities in the graphic image having at least one dimension smaller than a threshold, so that information derived from scanning such irregularities does not appear in the output records; and fuzz elimination means for suppressing from being output data representative of a graphic feature which branches out from another scanned feature for less than a number of scan lines corresponding to the threshold.

32. An apparatus according to claim 31, wherein the apparatus includes means for setting the threshold, so that the sensitivity of the apparatus may be set in accordance with the size of the artifacts characteristic of the graphic image being processed.

33. An apparatus according to claim 31, further including means for squaring off irregularities of height less than the threshold occurring at the end of a scanned vector.

34. An apparatus according to claim 31, wherein the apparatus includes means for adaptively defining the threshold so that the dimensions of features rejected as artifact are determined by the dimensions of features scanned on the document.

35. An apparatus according to claim 31, further including junction leveling means for determining when there occurs within the threshold number of scan lines a multiplicity of branches from a common junction surface and, in that event, for encoding a representation of the common junction surface.

36. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting coordinates of a run of consecutive like-valued signals along a scan line, such coordinates being indicative of the width and location on such scan line of the run;

memory means for storing at a given time blocks of processed data, each block related to a single vector which has been previously scanned, and such data including for each vector a coordinate pair descriptive of the width and location of the vector at an initial scan line of which the vector first occurs and a coordinate pair descriptive of the width and location of the vector at the scan line of which data pertaining to the vector was last obtained;

slope calculation means for calculating on a recurring basis the average rate of change per scan line of each of the coordinate pairs over the length of the vector;

prediction means, using data from the slope calculation means, for predicting the coordinates descriptive of the width and location of a run of like-valued signals applicable to a vector on a current scan line; and connectivity means for determining whether the coordinates descriptive of a given run are predicted within a prescribed measure of accuracy by the prediction means using data from the application of the slope calculation means to a given vector in the memory means and, in the event of a prediction within the prescribed measure of accuracy, for updating the data for the given vector in the memory means;

vector memory means for storing in an ordered sequence during encoding, vector records, each record containing data representative of the image scanned on at least one preceding scan line;

arithmetic logic means for comparing the data output from the clearing means with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

artifact removal means, in communication with the arithmetic logic means, for removing artifact irregularities in the graphic image having at least one dimension smaller than a threshold, so that information derived from scanning such irregularities does not appear in the output records, the artifact removal means including means for determining whether a feature being scanned is noise of a type characteristic of the image being scanned and, in that case, eliminating data corresponding to such artifact from the encoded record; and means for preserving data related to the notch of a downward branching junction for successive scan lines until it has been determined whether the junction is the top of a hole, and means for filling the hole and deleting such branch junction data in that case.

37. An apparatus according to claim 36, wherein the hole-filling means includes means for receiving scan data derived from subsequent scans of the notch and for examining that data to determine whether the notch has a height and width within predetermined hole height and width limits.

38. An apparatus according to claim 37, wherein the control means includes means to deliver and output record containing the preserved junction data in the event the hole-filling means determines that the junction is not a hole.

39. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting coordinates of a run of consecutive like-valued signals along a scan line, such coordinates being indicative of the width and location on such scan line of the run;

memory means for storing at a given time blocks of processed data, each block related to a single vector which has been previously scanned, and such data including for each vector a coordinate pair descriptive of the width and location of the vector at an initial scan line of which the vector first occurs and a coordinate pair descriptive of the width and location of the vector at the scan line of which data pertaining to the vector was last obtained;

slope calculation means for calculating on a recurring basis the average rate of change per scan line of each of the coordinate pairs over the length of the vector;

prediction means, using data from the slope calculation means, for predicting the coordinates descriptive of the width and location of a run of like-valued signals applicable to a vector on a current scan line;

connectivity means for determining whether the coordinates descriptive of a given run are predicted within a prescribed measure of accuracy by the prediction means using data from the application of the slope calculation means to a given vector in the memory means and, in the event of a prediction within the prescribed measure of accuracy, for updating the data for the given vector in the memory means;

vector memory means for storing in an ordered sequence during encoding, vector records, each record containing data representative of the image scanned on at least one preceding scan line;

arithmetic logic means for comparing the data output from the clearing means with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction;

artifact removal means, in communication with the arithmetic logic means, for removing artifact irregularities in the graphic image having at least one dimension smaller than a threshold, so that information derived from scanning such irregularities does not appear in the output records, the artifact removal means including means for determining whether a feature being scanned is noise of a type characteristic of the image being scanned, and in that case eliminating data corresponding to such artifact from the encoded record; and flyspeck removal means for determining when a vector is of a width less than a width threshold characteristic of flyspecks and is of height less than a height threshold.

40. An apparatus according to claim 39, wherein the artifact removal means includes means for removing artifact irregularities in the graphic image having a height smaller than a height threshold.

41. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting coordinates of a run of consecutive like-valued signals along a scan line, such coordinates being indicative of the width and location on such scan line of the run;

memory means for storing at a given time blocks of processed data, each block related to a single vector which has been previously scanned, and such data including for each vector a coordinate pair descriptive of the width and location of the vector at an initial scan line of which the vector first occurs and a coordinate pair descriptive of the width and location of the vector at the scan line of which data pertaining to the vector was last obtained;

slope calculation means for calculating, on a recurring basis, the average rate of change per scan line of each of the coordinate pairs over the length of the vector;

prediction means, using data from the slope calculation means, for predicting the coordinates descriptive of the width and location of a run of like-valued signals applicable to a vector on a current scan line;

connectivity means for determining whether the coordinates descriptive of a given run are predicted within a prescribed measure of accuracy, by the prediction means using data from the application of the slope calculation means to a given vector in the memory means and, in the event of a prediction within the prescribed measure of accuracy, for updating the data for the given vector in the memory means;

vector memory means for storing in an ordered sequence during encoding, vector records, each record containing data representative of the image scanned on at least one preceding scan line;

arithmetic logic means for comparing the data output from the clearing means with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction; and junction surface identification means, in communication with the arithmetic logic means for determining when a multiple branched junction has been scanned and, in such event, for causing the output of an output record representative of a common junction surface for such junction, the junction surface identification means including junction leveling means for determining when there occurs within a threshold number of scan lines a multiplicity of branches from a common junction surface.

42. An apparatus, operative on input signals representative of coordinates of intercepts along substantially parallel scans of a two-dimensional image, for encoding the graphic information therein by generation of a series of output records representative of significant graphic data, such data including branch junction type and coordinate data, the apparatus comprising:

data compression means for extracting coordinates of a run of consecutive like-valued signals along a scan line, such coordinates being indicative of the width and location on such scan line of the run;

memory means for storing at a given time blocks of processed data, each block related to a single vector which has been previously scanned, and such data including for each vector a coordinate pair descriptive of the width and location of the vector at an initial scan line of which the vector first occurs and a coordinate pair descriptive of the width and location of the vector at the scan line of which data pertaining to the vector was last obtained;

slope calculation means for calculating on a recurring basis the average rate of change per scan line of each of the coordinate pairs over the length of the vector;

prediction means, using data from the slope calculation means, for predicting the coordinates descriptive of the width and location of a run of like-valued signals applicable to a vector on a current scan line;

connectivity means for determining whether the coordinates descriptive of a given run are predicted within a prescribed measure of accuracy by the prediction means using data from the application of the slope calculation means to a given vector in the memory means and, in the event of a prediction within the prescribed measure of accuracy, for updating the data for the given vector in the memory means;

vector memory means for storing in an ordered sequence during encoding, vector records, each record containing data representative of the image scanned on at least one preceding scan line;

arithmetic logic means, for comparing the data output from the clearing means with data from corresponding vector records to determine the occurrence of branch junctions and generate data representative thereof;

control means, in communication with the arithmetic logic means and with the vector memory means, for causing the output of output records, including data from vector records and branch junction data, when the arithmetic logic means has determined the occurrence of a branch junction; and junction surface identification means, in communication with the arithmetic logic means, for determining when a multiple branched junction has been scanned and, in such event, for causing the output of an output record representative of a common junction surface for such junction; and artifact removal means, in communication with the arithmetic logic means, for removing artifact irregularities in the graphic image having at least one dimension smaller than a threshold, so that information derived from scanning such irregularities does not appear in the output records, the artifact removal means including fuzz elimination means, for suppressing from being output data representative of a graphic feature which branches out from another-scanned feature for less than a number of scan lines corresponding to the threshold.

43. An apparatus according to claim 42, wherein the apparatus includes means for setting the threshold, so that the sensitivity of the apparatus may be set in accordance with the size of the artifacts characteristic of the graphic image being processed.

44. An apparatus according to claim 42, further including means for squaring off irregularities of height less than the threshold occurring at the end of a scanned vector.

45. An apparatus according to claim 42, wherein the apparatus includes means for adaptively defining the threshold so that the dimension of features rejected as artifact are determined by the dimensions of features scanned on the document.

* * * * *